United States Patent
Oda et al.

(10) Patent No.: US 12,045,997 B2
(45) Date of Patent: Jul. 23, 2024

(54) DISTANCE ESTIMATION DEVICE AND DISTANCE ESTIMATION METHOD

(71) Applicants: Kabushiki Kaisha Toshiba, Tokyo (JP); Toshiba Electronic Devices & Storage Corporation, Tokyo (JP)

(72) Inventors: Yuichi Oda, Yokohama Kanagawa (JP); Yutaka Yamada, Fuchu Tokyo (JP); Manabu Nishiyama, Setagaya Tokyo (JP); Yutaka Oki, Ome Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 282 days.

(21) Appl. No.: 17/468,390

(22) Filed: Sep. 7, 2021

(65) Prior Publication Data

US 2022/0301208 A1    Sep. 22, 2022

(30) Foreign Application Priority Data

Mar. 18, 2021    (JP) .................. 2021-044764

(51) Int. Cl.
  *G06T 7/55* (2017.01)
  *G06T 7/246* (2017.01)
  *G06T 7/70* (2017.01)

(52) U.S. Cl.
  CPC ............... *G06T 7/55* (2017.01); *G06T 7/248* (2017.01); *G06T 7/70* (2017.01)

(58) Field of Classification Search
  CPC ............. G06T 7/55; G06T 7/248; G06T 7/70
  See application file for complete search history.

(56) References Cited

U.S. PATENT DOCUMENTS

| | | | |
|---|---|---|---|
| 2015/0138322 A1* | 5/2015 | Kawamura | ............... G06T 7/73 348/46 |
| 2020/0334843 A1* | 10/2020 | Kasuya | ................... G01S 17/86 |
| 2021/0183096 A1 | 6/2021 | Yokokawa et al. | |
| 2021/0319577 A1* | 10/2021 | Tang | ..................... G06T 3/4007 |
| 2021/0407189 A1* | 12/2021 | Yamanaka | ................ G06T 7/12 |

FOREIGN PATENT DOCUMENTS

| | | | | |
|---|---|---|---|---|
| EP | 3633606 A1 | 4/2020 | | |
| JP | 2007263657 A | * 10/2007 | | |
| JP | 2018-139084 A | 9/2018 | | |
| WO | 2017/159312 A | 9/2017 | | |
| WO | 2018/216341 A1 | 11/2018 | | |
| WO | WO-2020090390 A1 | * 5/2020 | .......... G01S 13/867 |
| WO | 2020/158646 A1 | 8/2020 | | |

* cited by examiner

*Primary Examiner* — Vu Le
*Assistant Examiner* — Jack Peter Kraynak
(74) *Attorney, Agent, or Firm* — Maier & Maier, PLLC

(57) ABSTRACT

According to one embodiment, a distance estimation device comprises a first distance estimation unit based on a first estimation method, and a second distance estimation unit based on a second estimation method different from the first estimation method. The second distance estimation unit is configured to change a part of the second estimation method according to an output of the first distance estimation unit.

10 Claims, 20 Drawing Sheets

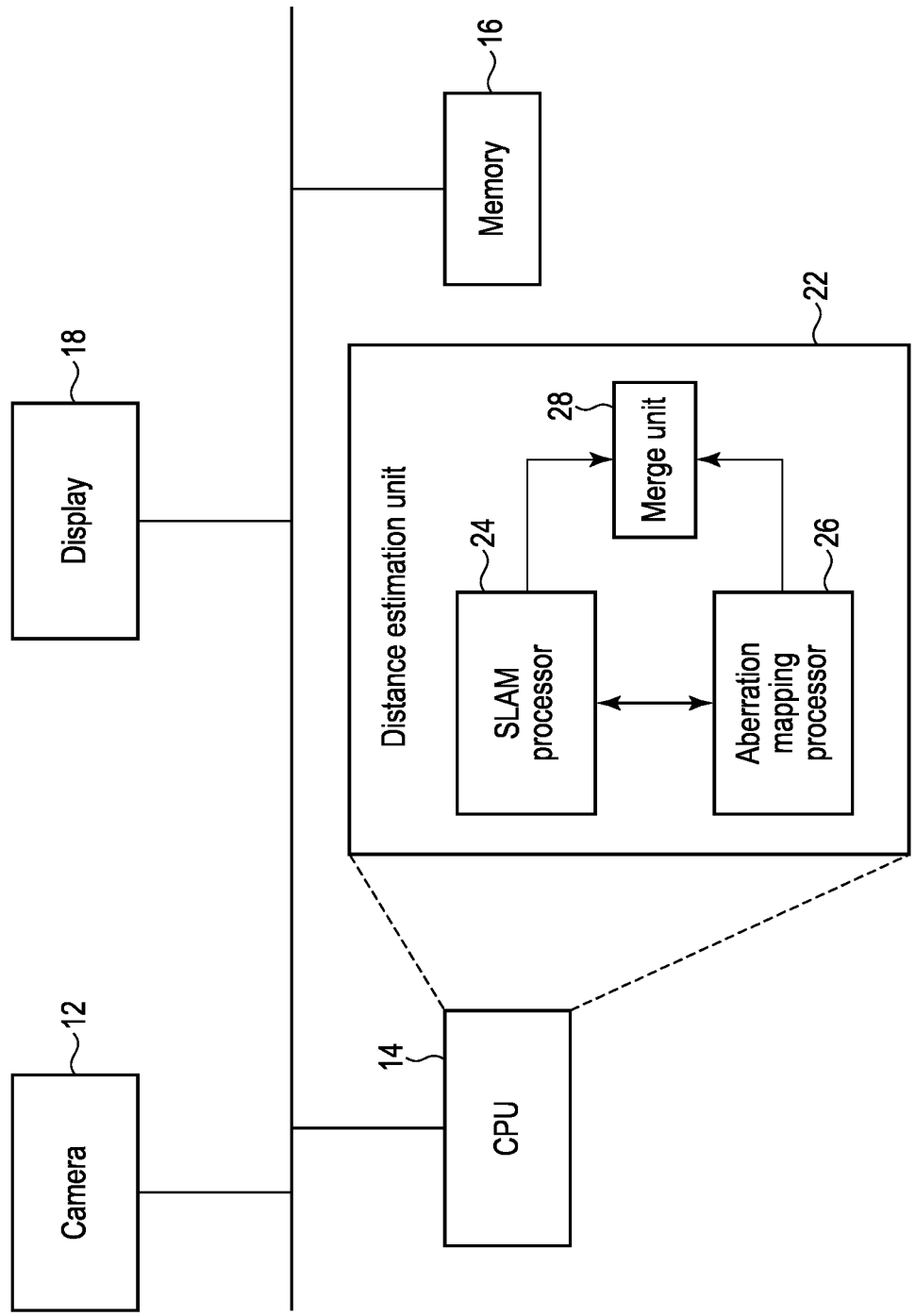
F I G. 1

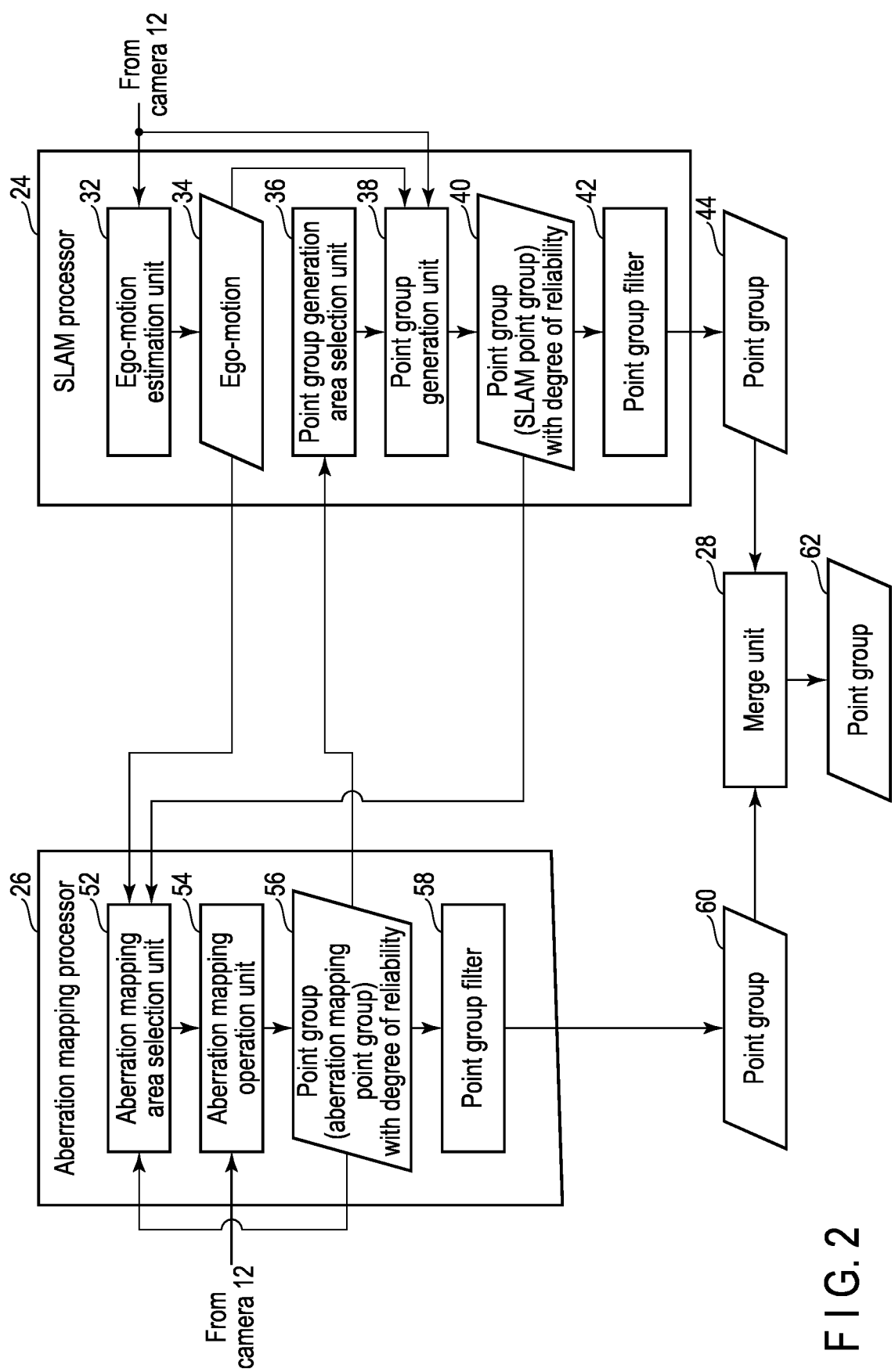
F I G. 2

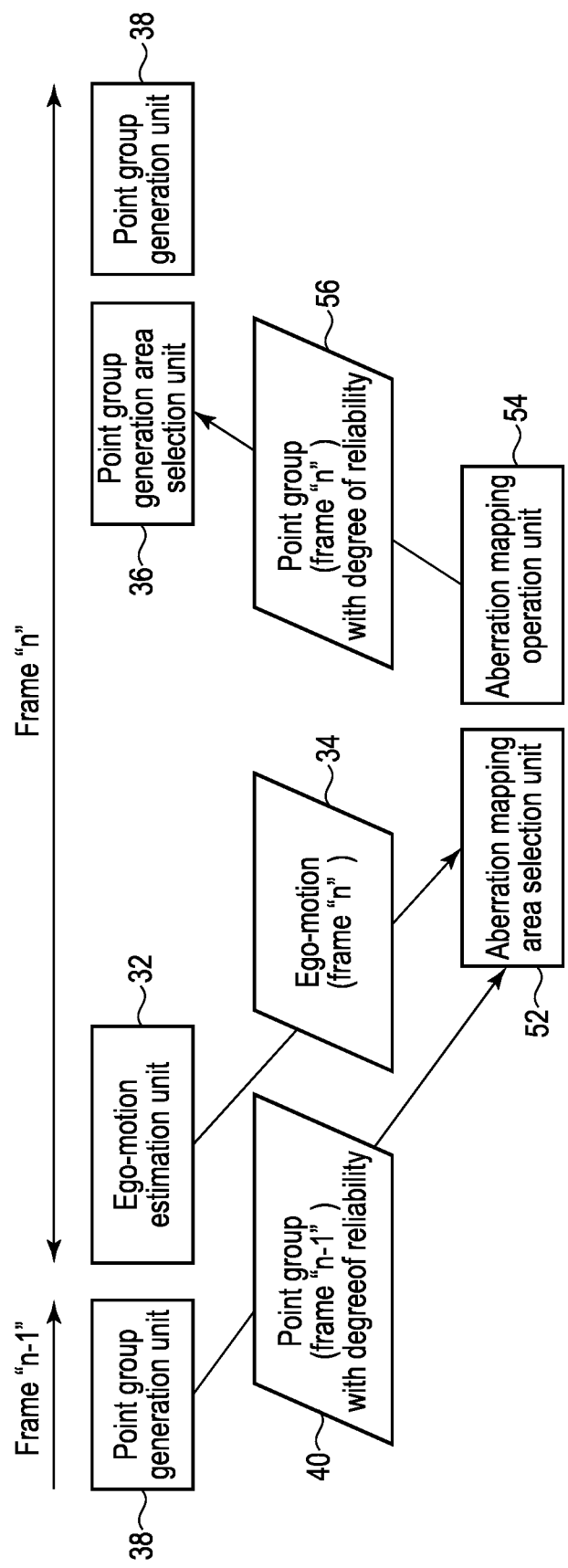
F I G. 3

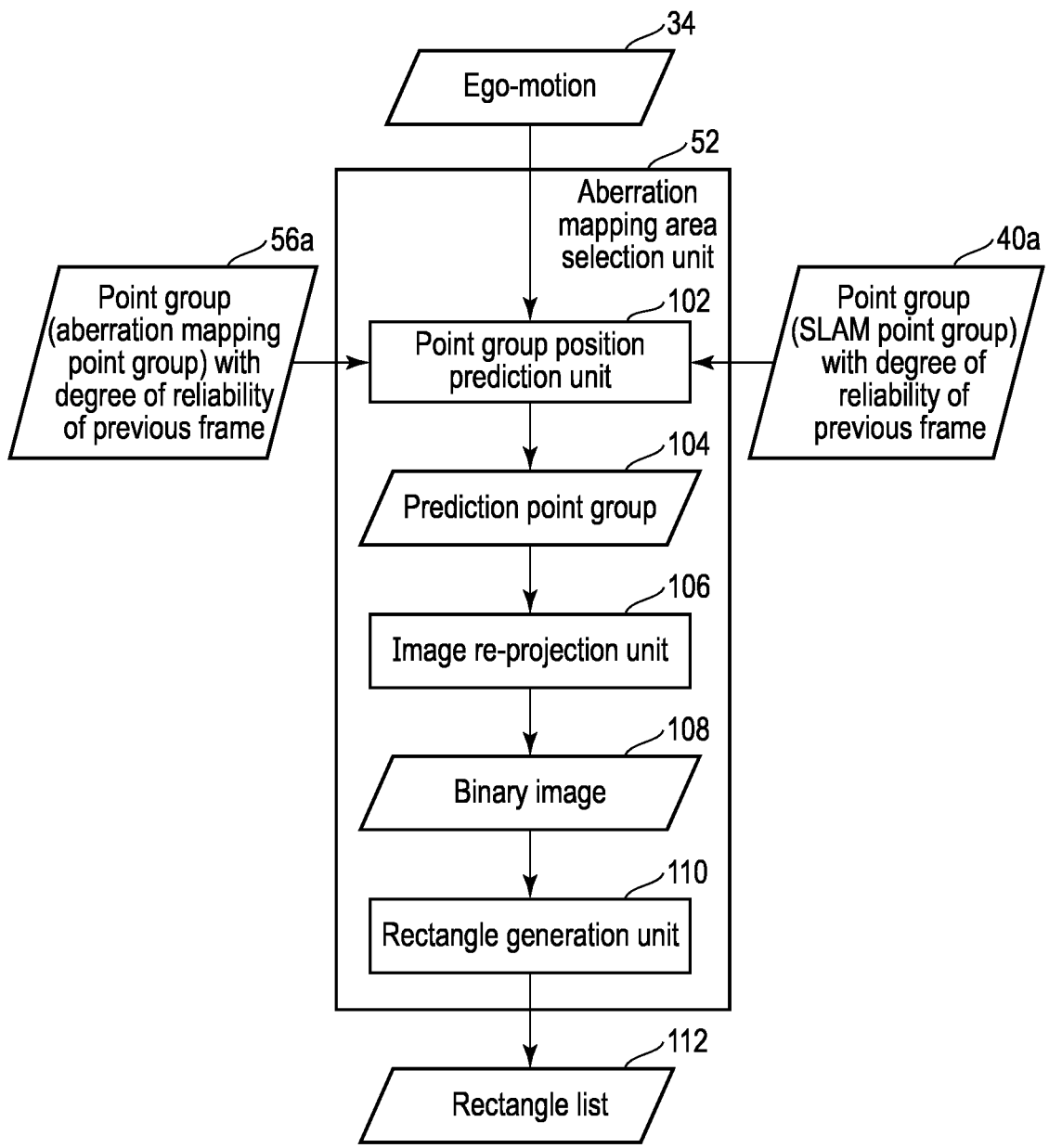
F I G. 4

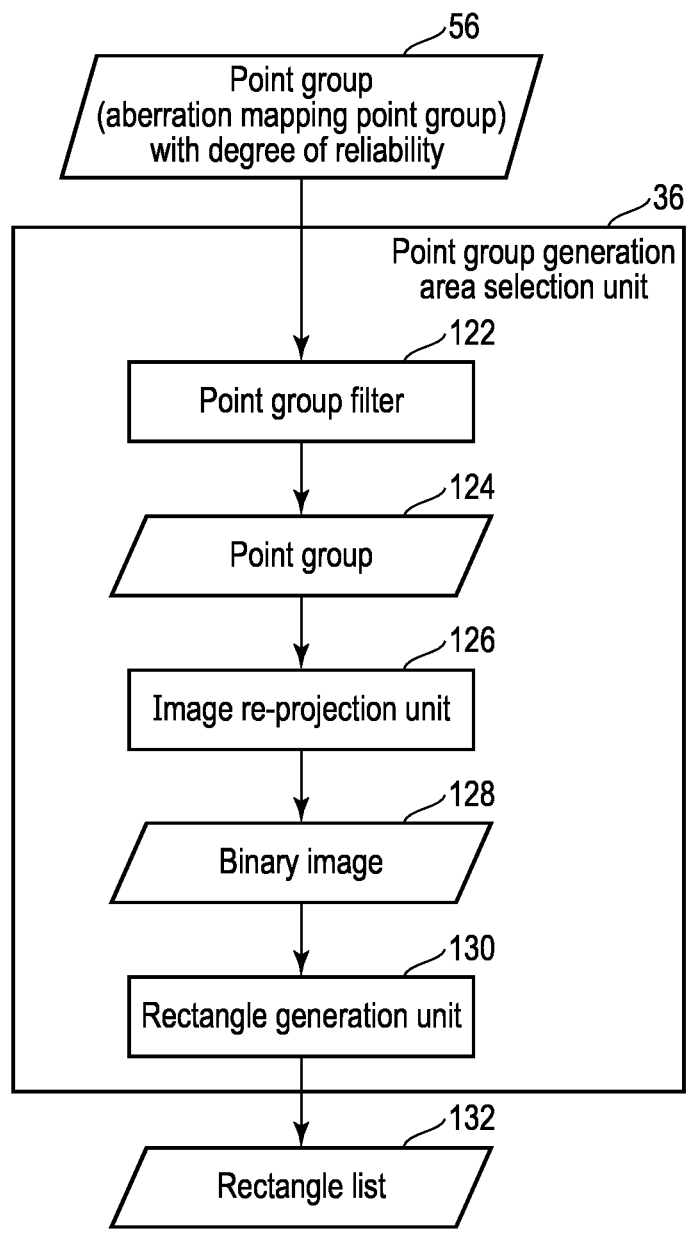
F I G. 6

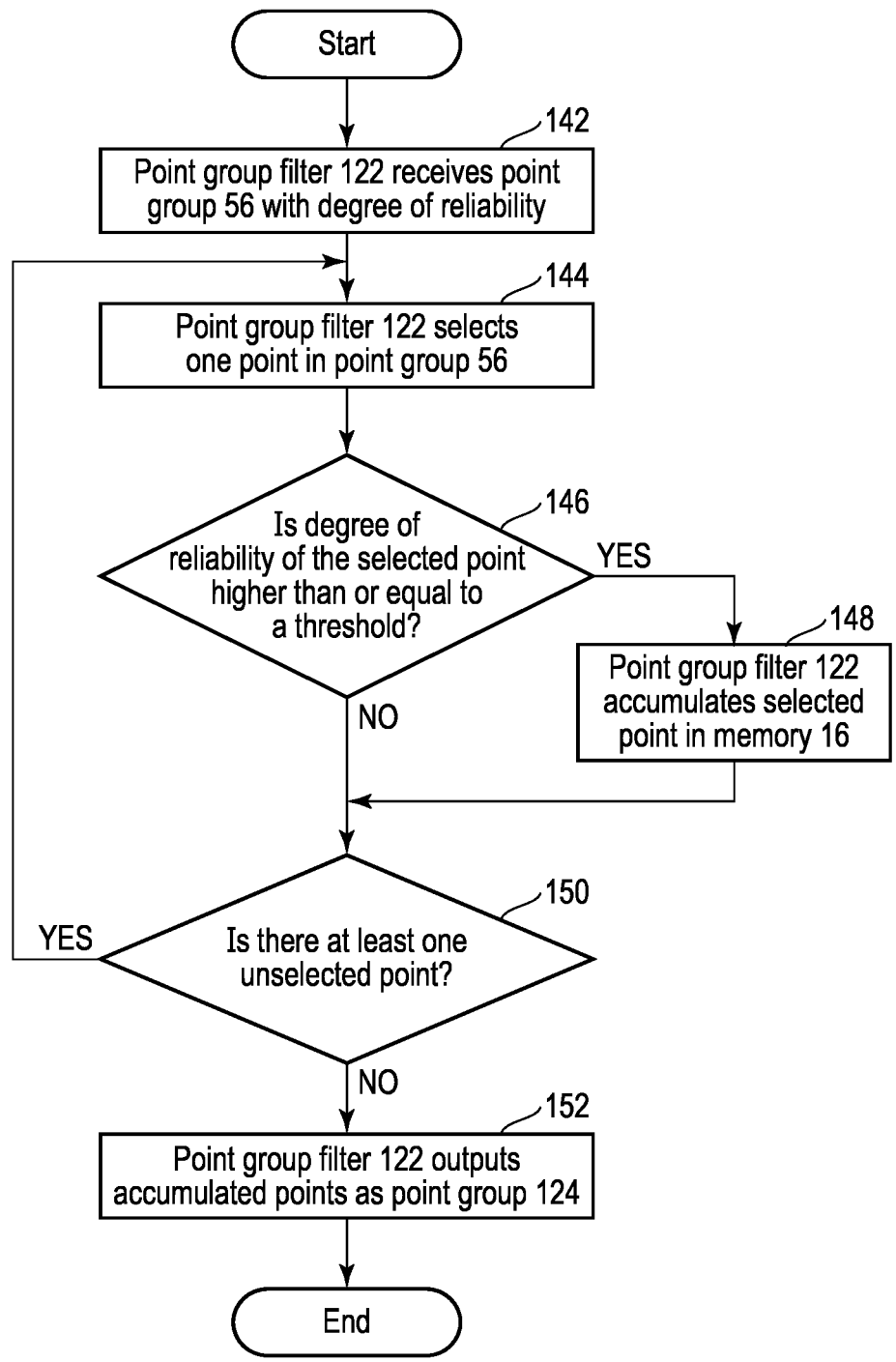
F I G. 10

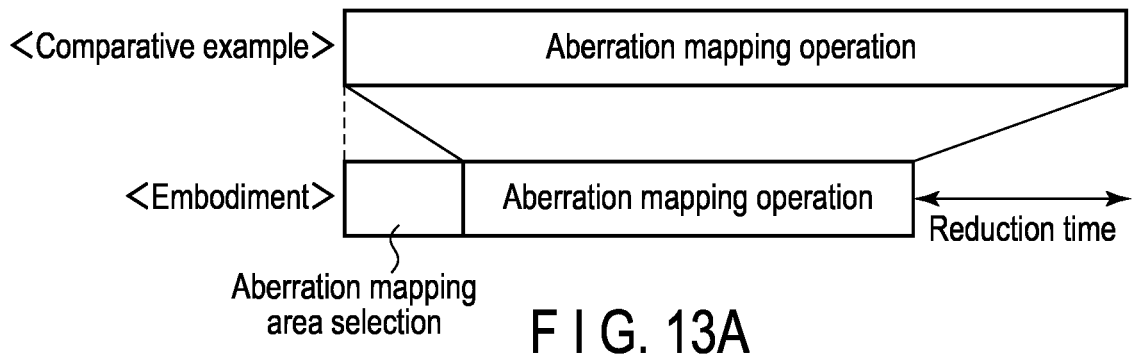
F I G. 13A
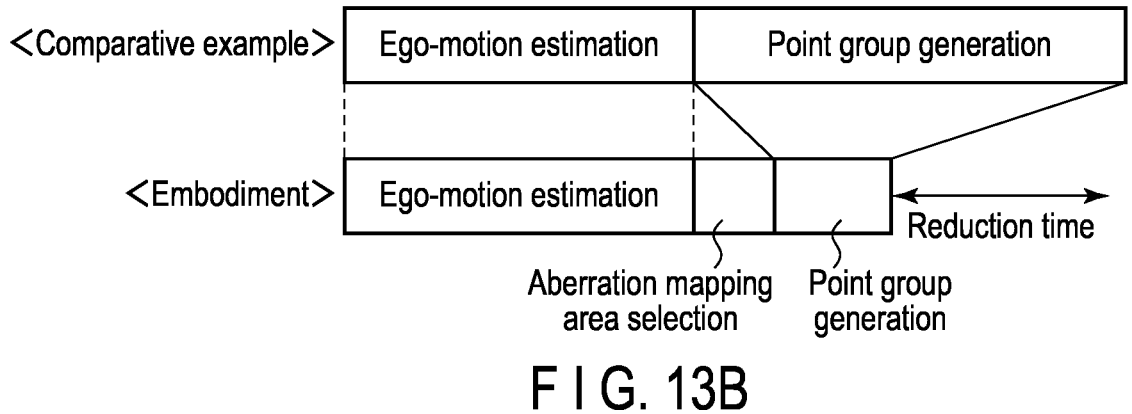
F I G. 13B
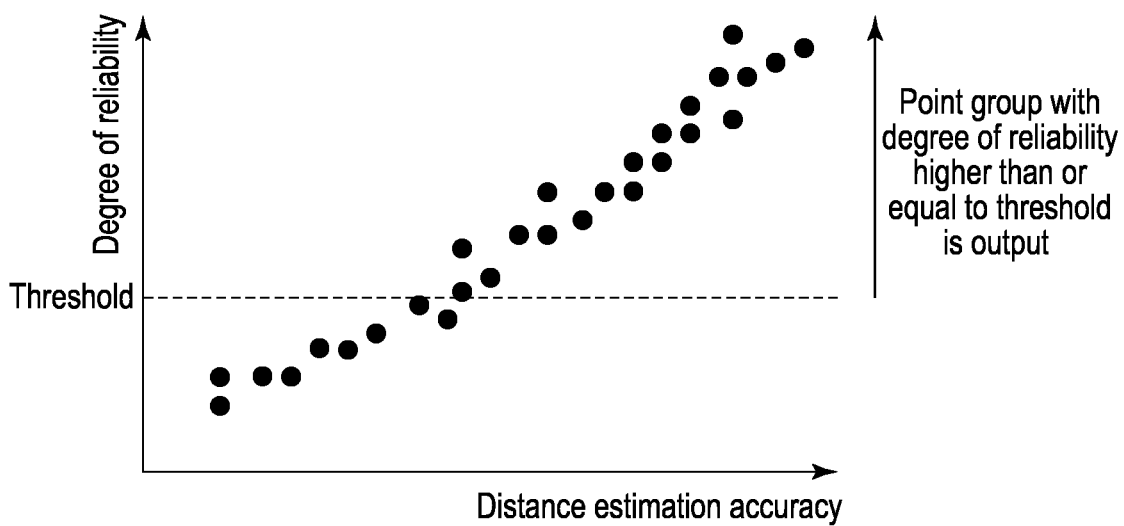
F I G. 14

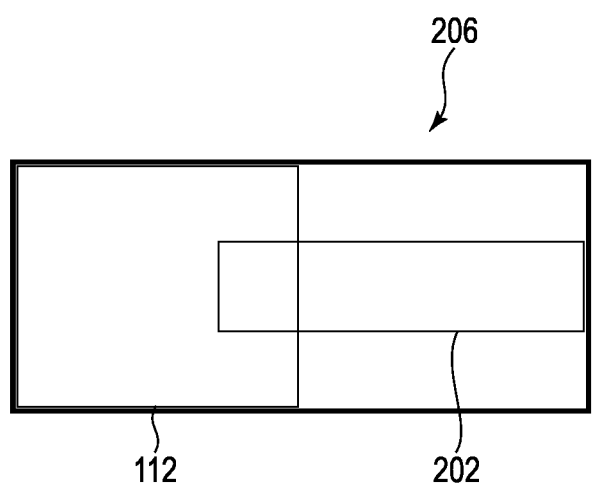
F I G. 16

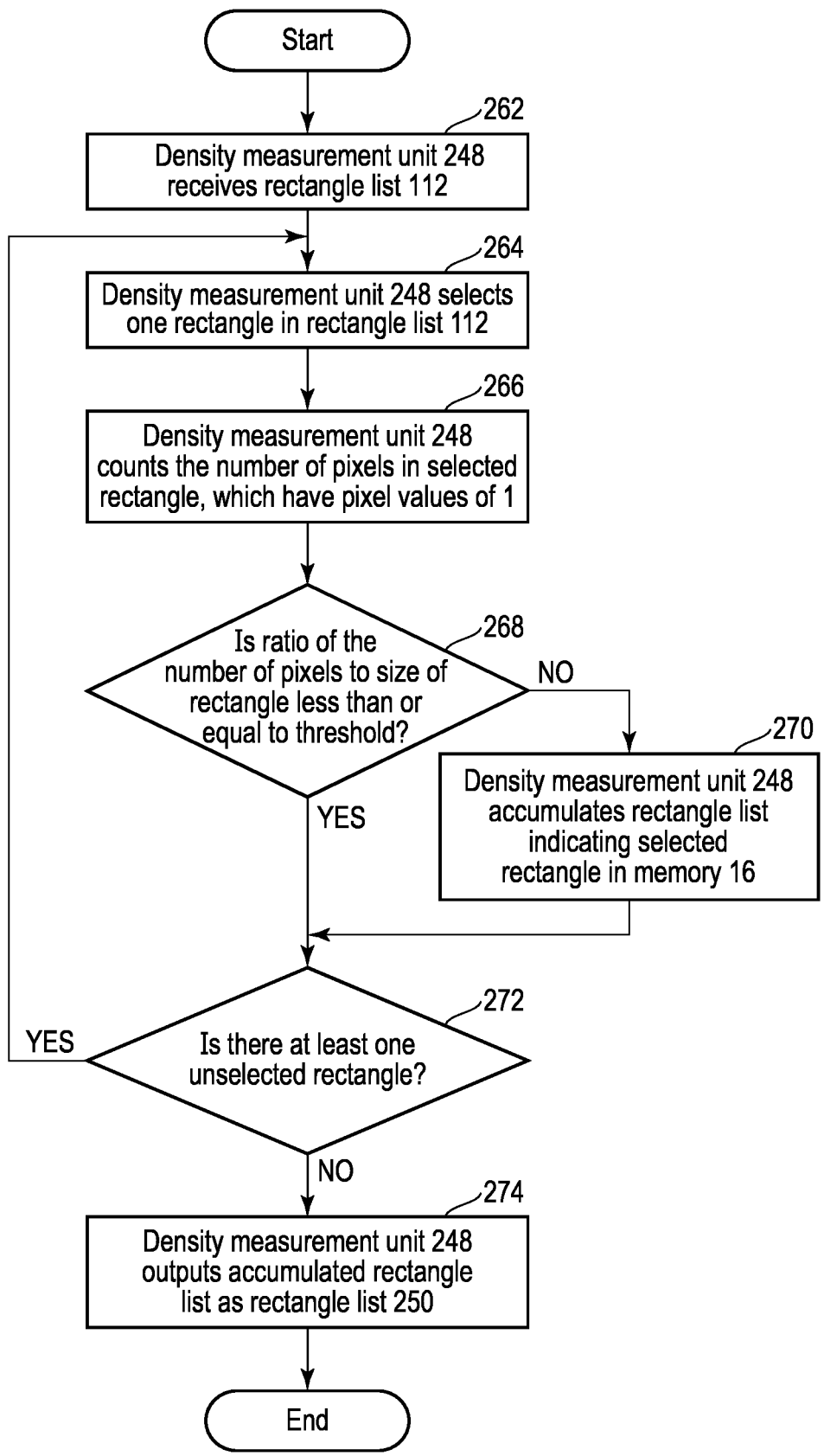
F I G. 18

DISTANCE ESTIMATION DEVICE AND DISTANCE ESTIMATION METHOD

CROSS-REFERENCE TO RELATED APPLICATIONS

This application is based upon and claims the benefit of priority from Japanese Patent Application No. 2021-044764, filed Mar. 18, 2021, the entire contents of which are incorporated herein by reference.

FIELD

Embodiments described herein relate generally to a distance estimation device and a distance estimation method for estimating the depth of a target object. The depth may be referred to as distance.

BACKGROUND

Conventional examples of the distance estimation device utilize the simultaneous location and mapping (SLAM) method and the aberration mapping method.

In both methods, it requires a great amount of processing time to estimate the distances of target objects in a wide range.

BRIEF DESCRIPTION OF THE DRAWINGS

FIG. 1 is a block diagram showing an example of a distance estimation device of a first embodiment.

FIG. 2 is a functional block diagram showing an example of a distance estimation unit of the first embodiment.

FIG. 3 is a timing chart illustrating an example of input/output between an SLAM processor and an aberration mapping processor of the distance estimation unit of the first embodiment.

FIG. 4 is a functional block diagram illustrating an example of an aberration mapping area selection unit of the first embodiment.

FIG. 6 is a functional block diagram illustrating an example of the first embodiment.

FIG. 7 shows another example of the rectangle list of the first embodiment.

FIG. 9 shows another example of the rectangle list of the first embodiment.

FIG. 10 is a flowchart showing an example of the process of a point group filter of the first embodiment.

FIGS. 13A and 13B are diagrams illustrating a total processing time of the distance estimation device of the first embodiment.

FIG. 14 is a diagram illustrating an example of an improvement in distance estimation accuracy of the distance estimation device of the first embodiment.

FIG. 16 illustrates an example of the process of a rectangle integration unit of the second embodiment.

FIG. 18 is a flowchart illustrating an example of the process of a density measurement unit of the third embodiment.

DETAILED DESCRIPTION

Figure 5:
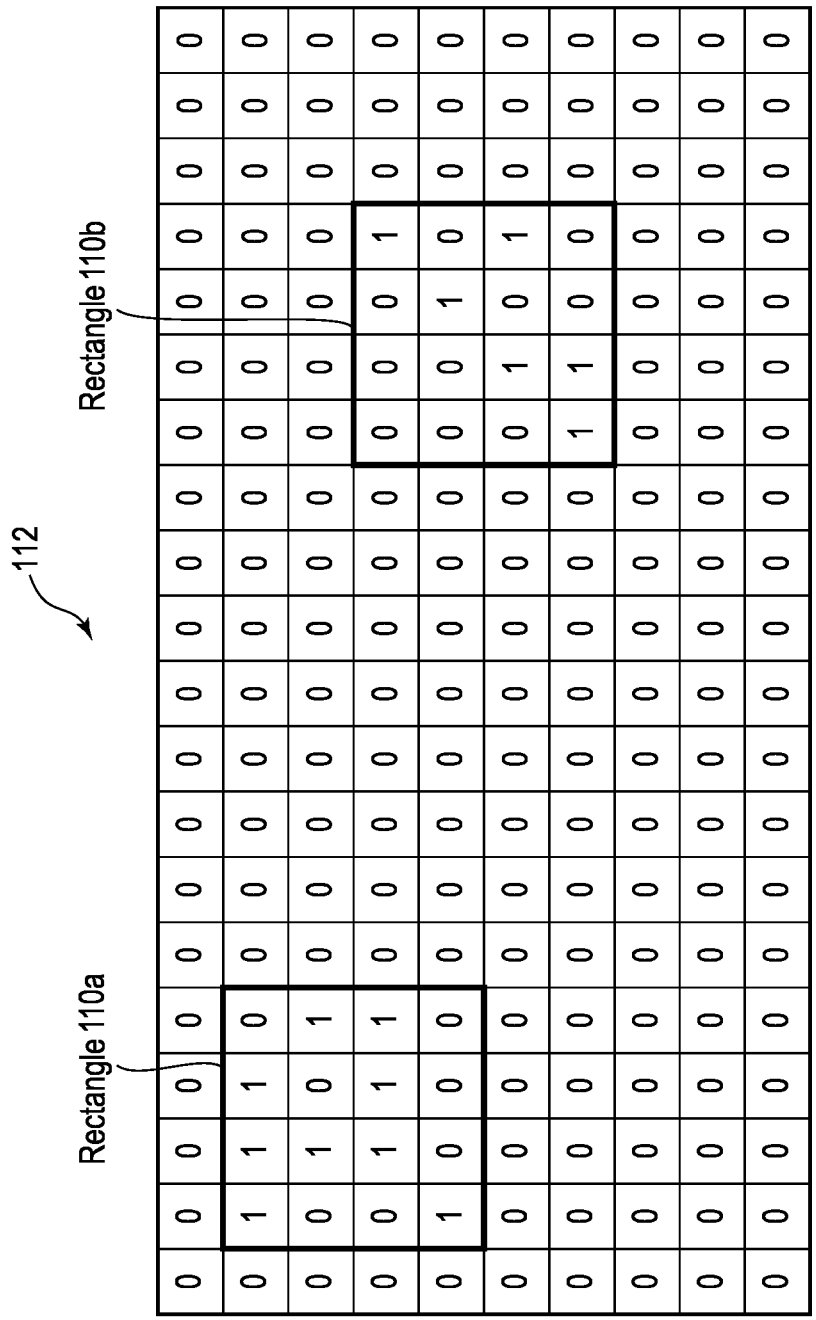
FIG. 5 shows an example of a rectangle list of the first embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, a distance estimation device comprises a first distance estimation unit based on a first estimation method; and a second distance estimation unit based on a second estimation method different from the first estimation method. The second distance estimation unit is configured to change a part of the second estimation method according to an output of the first distance estimation unit.

First Embodiment

FIG. 1 is a block diagram showing an example of a distance estimation device of the first embodiment. The distance estimation device is configured to estimate the distance of each pixel of an image of the target object based on the image. In the first embodiment, the distance estimation device is configured to also estimate the three-dimensional position of each pixel from the estimated distance of each pixel. The three-dimensional position is referred to as 3D coordinates. The estimation of the 3D coordinates of each pixel is referred to as estimating a point. It is not always necessary for the distance estimation device to estimate points, but it may as well suffice just to estimate the distance. A set of points that constitute a target object is called a point group.

An example of application of the distance estimation device may be an automatic driving device to be mounted on a vehicle, drone, self-propelled robot, and the like. The automatic driving device estimates the positions of obstacles in the surroundings to prevent collisions therewith.

The distance estimation device estimates point groups by multiple estimation methods and combines (also referred to as merging) the point groups estimated by multiple estimation methods. The estimation methods differ from each other in the type of image and the area in the image, where the point group can be estimated with a high degree of reliability. Therefore, if one estimation method is used to estimate a point group for one area, whereas another method is used to estimate a point group for another area, and then the point groups of both methods are combined, it becomes possible to estimate the point group with a high degree of reliability for a wide area.

In the first embodiment, the SLAM method and the aberration mapping method are used as multiple distance estimation methods. However, these methods are only examples, and other methods may be used. Further, the number of methods used is not limited to two, but may be three or more.

The distance estimation device includes a camera 12, a CPU 14, a memory 16, and a display 18. In the SLAM method, a stereo camera or a monocular camera is used. In the aberration mapping method, a monocular camera is used. If one camera is used for both the SLAM method and the aberration mapping method, a monocular camera is used as the camera 12. In the SLAM method, the position of an object is estimated based on triangulation. In the SLAM method using a monocular camera, the monocular camera is attached to a moving member for changing a shooting angle and captures images of the target object from two different angles. However, in place of using one camera for both the SLAM and aberration mapping methods, a stereo camera for the SLAM method and a monocular camera for the aberration mapping method may be provided respectively. In the first embodiment, a single monocular camera is used as the camera 12.

The memory 16 stores data under calculation and programs to be executed by the CPU 14. The programs include a distance estimation program.

The CPU 14 executes the distance estimation program stored in the memory 16 and functions as a distance estimation unit 22. The distance estimation unit 22 estimates the distance to each point of the target object and estimates the point group based on the results of the estimation.

The display 18 displays the estimated point group. An example of the display of the point group is a distance image where each pixel of a two-dimensional image is colored according to the distance information. The display is an example of the output mode. The output mode is not limited to display, but may as well be such mode that transmits an output result to some other device. In that case, a transmitter is provided in place of the display 18.

The distance estimation unit 22 includes an SLAM processor 24, an aberration mapping processor 26, and a merge unit 28.

The SLAM processor 24 acquires characteristic points of two images output from the camera 12 and captured at different angles, and estimates the distance to each point of the target object by triangulation utilizing the geometric relationship of the characteristic points. Then, the SLAM processor 24 estimates the point group based on the results of the distance estimation.

The aberration mapping processor 26 calculates blur information (referred to as an aberration map) of an image from a single image output from the camera 12. The aberration map is due to lens aberration that varies with the distance of the target object and the position of the image. The aberration mapping processor 26 estimates the distance based on the aberration mapping. Then, the aberration mapping processor 26 estimates the point group based on the result of the distance estimation. The aberration mapping processor 26 analyzes the correspondence between the distance of the target object or the position of the image and the aberration map, for example, utilizing a deep neural network. The aberration mapping processor 26 estimates the distance to each point of the target object. For the analysis of the aberration characteristics, the point spread function (PSF) is used. The PSF is a function that represents how the light from a single point (point source) of a subject forms an image while spreading out after passing through the camera lens (blur shape and coloration). The PSF varies depending on the distance and in-plane position of the subject relative to the camera lens. The correspondence of the PSF with the distance and in-plane position is the aberration mapping.

The merge unit 28 combines the point group estimated by the SLAM processor 24 and the point group estimated by the aberration mapping processor 26.

Note that the distance estimation unit 22 may be realized not by software, but by hardware.

FIG. 2 is an example of a block diagram showing functions of the distance estimation unit 22 shown in FIG. 1. The SLAM processor 24 includes an ego-motion estimation unit 32, a point group generation area selection unit 36, a point group generation unit 38, and a point group filter 42. The aberration mapping processor 26 includes an aberration mapping area selection unit 52, an aberration mapping operation unit 54, and a point group filter 58.

The camera 12 is mounted on a moving mechanism and periodically captures images of the target from two different angles (for example, from left and right displaced positions). For example, at a certain time "T", two frames of images with different angles captured at two different times T−1 and T are supplied to the SLAM processor 24. The time "T−1" is one previous time to the time "T" in the time series. At the time "T", the aberration mapping processor 26 is supplied with only one frame image captured at the time "T". In the SLAM processor 24, the two images are supplied to both of the ego-motion estimation unit 32 and the point group generation unit 38. In the aberration mapping processor 26, the image is supplied to the aberration mapping operation unit 54.

The ego-motion estimation unit 32 estimates the distance from the two images. The ego-motion estimation unit 32 estimates the amount of movement and change in posture of the camera 12 and outputs the estimation results as an ego-motion 34. The ego-motion estimation unit 32 supplies the ego-motion 34 to the point group generation unit 38 and the aberration mapping area selection unit 52 in the aberration mapping processor 26.

The point group generation area selection unit 36 selects an area in the image (a point group generation area) based on a point group 56 with a degree of reliability (which will be later described) output from the aberration mapping operation unit 54. The point group generation area is an area where the point group is to be estimated by the SLAM processor 24. The point group generation area selection unit 36 supplies information indicating the point group generation area (referred to as a rectangle list) to the point group generation unit 38.

The point group generation unit 38 estimates the distance of each point of the target object by triangulation from the two images in the point group generation area. The point group generation unit 38 estimates a point group 40 in the point group generation area from the optical parameters and the distance of the camera 12. A degree of reliability or accuracy of the distance estimation by the point group generation unit 38 depends on the type of image and the locations of the points (pixels). Therefore, the point group generation unit 38 obtains a degree of reliability of the estimated distance and estimates a point group with a degree of reliability as a point group 40. Generally, as the parallax between two images is higher, the accuracy of triangulation is higher. Therefore, for example, the parallax can be utilized as a degree of reliability. The point group generation unit 38 supplies a point group 40 with a degree of reliability to the point group filter 42 and the aberration mapping area selection unit 52 in the aberration mapping processor 26.

The point group filter 42 filters a point in the point group 40 based on a degree of reliability, and does not output a point with a degree of reliability lower than or equal to a threshold, and outputs only points with a degree of reliability higher than the threshold as the point group 44.

In the aberration mapping processor 26, the aberration mapping area selection unit 52 selects an area in the image (aberration mapping area). The aberration mapping area is an area where the point group is to be estimated by the aberration mapping operation based on the ego-motion 34, the point group 40 with a degree of reliability, and the point group 56 with a degree of reliability output from the aberration mapping operation unit 54 (which will be described later). The aberration mapping area selection unit 52 supplies information indicating the aberration mapping area (referred to as a rectangle list) to the aberration mapping operation unit 54.

The aberration mapping operation unit 54 calculates the aberration map of the image in the aberration mapping area, estimates the distance from the aberration mapping using a deep learning neural network, and estimates a point group 56 in the aberration mapping area from optical parameters of the camera 12 and the distance. As in the case of the distance estimation by the point group generation unit 38, a degree of reliability of the distance estimation by the aberration mapping operation unit 54 also depends on the type of image and the locations of the points (pixels). Therefore, the aberration mapping operation unit 54 obtains a degree of reliability of the estimated distance and estimates a point group with a degree of reliability as the point group 56. The aberration mapping operation unit 54 supplies a point group 56 with a degree of reliability for the aberration mapping area, to the point group filter 58, the aberration mapping area selection unit 52 and the point group generation area selection unit 36 of the SLAM processor 24.

The point group filter 58 filters a point in the point group 56 based on the degree of reliability, and does not output a point or points with a degree of reliability lower than or equal to a threshold, but outputs a point or points with a degree of reliability higher than the threshold as a point group 60.

The thresholds of the point group filters 42 and 58 may be the same or different from each other.

The merge unit 28 combines the point group estimated by the SLAM processor 24 with the point group estimated by the aberration mapping processor 26. If the area where the point group 44 is estimated by the SLAM processor 24 and the area where the point group 60 is estimated by the aberration mapping processor 26 are different, the merge unit 28 simply combines the two types of point groups 44 and 60, and outputs a point group 62. If the area where the point group 44 is estimated by the SLAM processor 24 and the area where the point group 60 is estimated by the aberration mapping processor 26 include an overlapping area, the merge unit 28 selects a point group with higher a degree of reliability in the overlapping area. In order to achieve this, the rectangle information on which the generation of the point group is based is supplied to the merge unit 28. Thus, the point group 62 having a high degree of reliability over a wide area is estimated.

FIG. 3 is a timing chart illustrating an example of input/output between the SLAM processor 24 and the aberration mapping processor 26 of the distance estimation unit 22 shown in FIG. 2.

When two images of a frame "n−2" captured at a time "T−2" and a frame "n−1" captured at a time "T−1" are supplied to the point group generation unit 38, the point group generation unit 38 estimates the point group 40 with a degree of reliability of the frame "n−1" from the two images in the point group generation area, and supplies the point group 40 with a degree of reliability to the aberration mapping area selection unit 52.

When the two images of the frame "n−1" and a frame "n" are supplied to the ego-motion estimator 32, the ego-motion estimator 32 generates an ego-motion 34 of the frame "n" and supplies the ego-motion 34 to the aberration mapping area selection unit 52.

The aberration mapping area selection unit 52 selects an aberration mapping area of the frame "n" based on the point group 40 (SLAM point group) with a degree of reliability of the frame "n−1" and the ego-motion 34 of the frame "n". The aberration mapping operation unit 54 estimates the point group 56 with a degree of reliability of the frame "n" in the aberration mapping area and supplies the point group 56 with a degree of reliability to the point group generation area selection unit 36.

The point group generation area selection unit 36 selects a point group generation area based on the point group 56 (aberration mapping point group) with a degree of reliability of the frame "n". The point group generation unit 38 estimates the point group 40 with a degree of reliability of the frame "n" in the point group generation area, and supplies the point group 40 with a degree of reliability to the aberration mapping area selection unit 52.

The aberration mapping area selection unit 52 selects an area based on the prediction rectangle of the current frame for the image of one previous frame, which is generated in the form of the point group by the aberration mapping operation unit 54. If the target object target is out of the shooting range of the camera 12, there results no area to be processed by the aberration mapping operation. To avoid this, the point group 40 generated by the SLAM processor 24 is supplied to the aberration mapping area selection unit 52. The SLAM processor 24 and the aberration mapping processor 26 both can reliability estimate the distance near the edge of the image. Therefore, the area generated as a point group by the SLAM processor 24 may as well be generated as a point group by the aberration mapping processor 26 in the future. The area generated in the form of a point group by the SLAM processor 24 can be utilized as a new area to be processed by the aberration mapping operation.

The point group generation area selection unit 36 selects a point group generation area based on the point group 56 estimated by the aberration mapping operation unit 54. Thus, the point group in the area where the point group is not estimated by the aberration mapping operation unit 54 can be supplemented by the results of the processing of the SLAM processor 24, to be estimated. More specifically, as will be described below, the point group generated by the SLAM processor 24 is projected onto the image and used as a new area to be added by the aberration mapping processor 26.

FIG. 4 is a functional block diagram illustrating an example of the aberration mapping area selection unit 52 shown in FIG. 2. The aberration mapping area selection unit 52 includes a point group position prediction unit 102, an image re-projection unit 106, and a rectangle generation unit 110. The ego-motion 34 of the current frame, a point group 56a (aberration mapping point group) with a degree of reliability of the previous frame, and a point group 40a (SLAM point group) with a degree of reliability of the previous frame are supplied to the point group position prediction unit 102.

The ego-motion 34 indicates the displacement between the position of the point group in the current frame and the position of the point group in the previous frame. Therefore, the point group of the current frame can be estimated from the ego-motion and the point group of the previous frame. Further, when a point group of a target object is estimated by the aberration mapping operation in one frame, it is highly likely that the point group of the target object will be estimated in the next frame as well. Moreover, in both the aberration mapping operation and the SLAM operation, it is highly likely that a point group with a high degree of accuracy is estimated near the edge of the image. Therefore, the area where the point group is estimated by the SLAM operation in one frame is likely to be estimated by the aberration mapping operation in the next frame. Thus, the point group position prediction unit 102 predicts the position of the point group, which indicates the position of the target object in the current frame, based on the ego-motion 34 of the current frame, the point group 56a (aberration mapping point group) with a degree of reliability of the previous frame, and the point group 40a (SLAM point group) with a degree of reliability of the previous frame, and generates a prediction point group 104 (aberration mapping point group) of the current frame. The point group position prediction unit 102 supplies the current frame prediction point group 104 to the image re-projection unit 106.

The image re-projection unit 106 generates a binary image 108 for all pixels in the image of the current frame. In the binary image 108, the pixel value of the pixel in an area where the target object is present, that is, the point is likely to be estimated, is represented by 1, and the pixel value of the pixel in an area where the target object is not present, that is, the point is not likely to be estimated, is represented by 0. Then, the unit 106 supplies the binary image 108 to the rectangle generation unit 110. The presence or absence of the target object in the image is predicted based on the binary image 108.

The rectangle generation unit 110 outputs a rectangle list 112 representing at least one smallest rectangle containing pixels whose pixel values are 1. The rectangle indicates an area where the target object is likely to be present in the current frame, that is, an area where the point is likely to be estimated by the aberration mapping operation.

FIG. 5 shows an example of the rectangle list 112. The rectangle list 112 indicates the coordinates of the pixels at the four corners of each of rectangles 110a and 110b. In FIG. 5, the rectangles 110a and 110b are squares, but lengths of the rectangles 110a and 110b may be different from widths of the rectangles 110a and 110b. If the rectangle is limited to a square of a predetermined size, the rectangle list 112 may indicate the coordinates of the pixel at a particular corner of the rectangle, for example, the upper left corner.

The rectangle list 112 is supplied to the aberration mapping operation unit 54. The aberration mapping operation unit 54 performs the aberration mapping operation not for the entire image, but for the rectangle indicated by the rectangle list 112. Thus, the time for the aberration mapping operation is shortened.

FIG. 6 is a functional block diagram illustrating an example of the point group generation area selection unit 36 shown in FIG. 2. The point group generation area selection unit 36 includes a point group filter 122, an image re-projection unit 126, and a rectangle generation unit 130. The point group 56 (aberration mapping point group) with a degree of reliability of the current frame is supplied to the point group filter 122. The point group filter 122 filters a point in the point group 56 based on the degree of reliability, and does not output a point with a degree of reliability lower than or equal to a threshold, but outputs a point with a degree of reliability higher than the threshold as a point group 124. Even if the point group 56 is generated by the aberration mapping operation unit 54, a point or points with low degrees of reliability are removed, and the point group 40 is generated by the SLAM processor 24.

The point group 124 output from the point group filter 122 is supplied to the image re-projection unit 126.

Similar to the image re-projection unit 106, the image re-projection unit 126 generates a binary image 128 for all pixels in the image of the current frame. In the binary image 128, the pixel value of the pixel in an area where the target object is present, that is, the point is likely to be estimated, is represented by 1, and the pixel value of the pixel in an area where the target object is not present, that is, the point is not likely to be estimated, is represented by 0. Then, the unit 126 supplies the binary image 128 to the rectangle generation unit 130.

The rectangle generation unit 130, contrary to the rectangle generation unit 110, outputs a rectangle list 132 representing at least one rectangle of a predetermined size or larger consisting only of pixels whose pixel values are 0. The rectangle indicates an area where no points are estimated by the aberration mapping operation.

Figure 7:
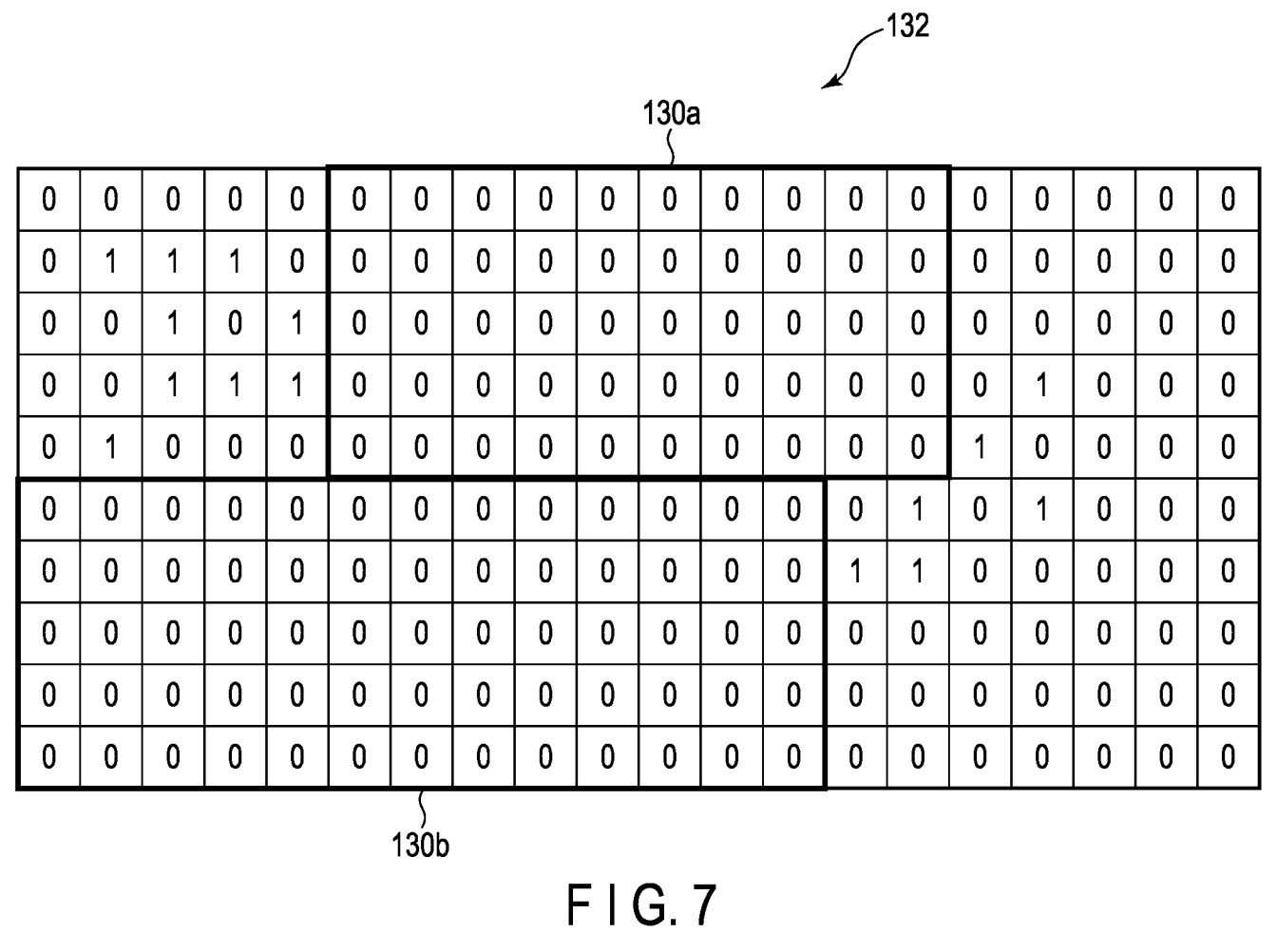

FIG. 7 shows an example of the rectangle list 132 where a certain size is defined as five pixels by five pixels. The rectangle list 132 shows the positions of the four corners of each of rectangles 130a and 130b of five pixels by five pixels or larger in size.

Figure 8:
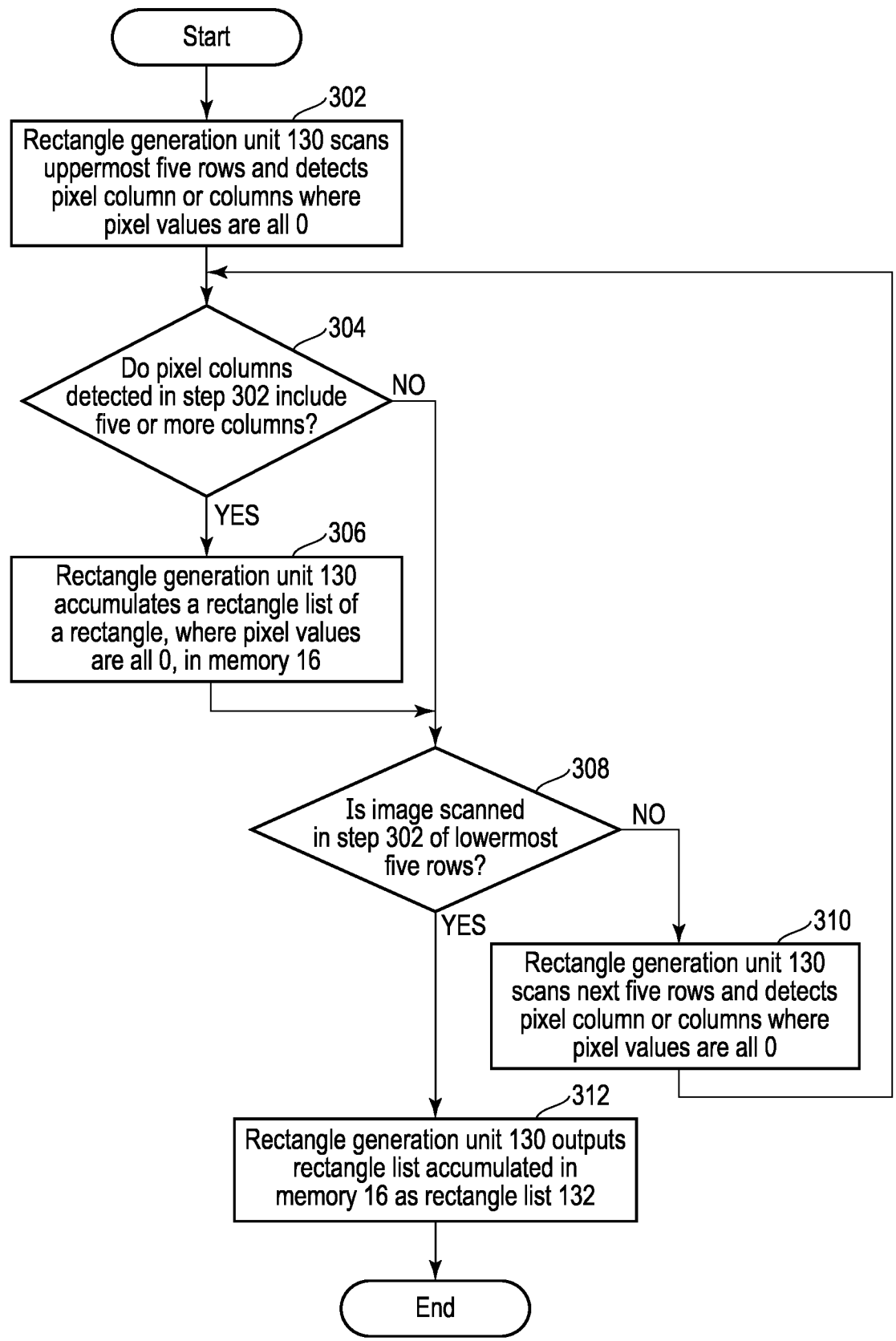
FIG. 8 shows a flowchart illustrating an example of the process of a rectangle generation unit of the first embodiment.

FIG. 8 shows a flowchart illustrating an example of the process of the rectangle generation unit 130.

In step 302, the rectangle generation unit 130 scans the uppermost five rows of the image for each pixel column of one pixel (horizontal direction) by five pixels (vertical direction), and detects the pixel column or columns where the pixel values are all 0.

In step 304, the rectangle generation unit 130 determines whether or not the pixel columns detected in step 302 include five or more columns in the horizontal direction. If the detected pixel columns include five or more columns in the horizontal direction (YES in step 304), in step 306, the rectangle generation unit 130 accumulates a rectangle list of a rectangle where the pixel values of the five, or more pixel columns are all 0, in the memory 16. After the process of step 306, the rectangle generation unit 130 executes the process of step 308.

If the detected pixel columns does not include five or more columns in the horizontal direction (NO in step 304), the rectangle generation unit 130 terminates the process of the five-row scanning and executes the process of step 308.

In step 308, the rectangle generation unit 130 determines whether or not an image scanned in step 302 is of the lowermost five rows. If the scanned image is not of the lowermost five rows (NO in step 308), in step 310, the rectangle generation unit 130 scans the next five rows of the image for each pixel column of one pixel (horizontal direction) by five pixels (vertical direction), and detects the pixel column or columns where the pixel values are all 0. After the process of step 310, the rectangle generation unit 130 executes the process of step 304.

If the image scanned in step 302 is the lowermost five rows (YES in step 308), in step 312, the rectangle generation unit 130 outputs the rectangle list accumulated in the memory 16 as the rectangle list 132. Thus, the rectangle list 132 as shown in FIG. 7 is generated.

The rectangle list 132 is supplied to the point group generation unit 38. The point group generation unit 38 generates a point group for the rectangle indicated by the rectangle list 132.

Figure 9:
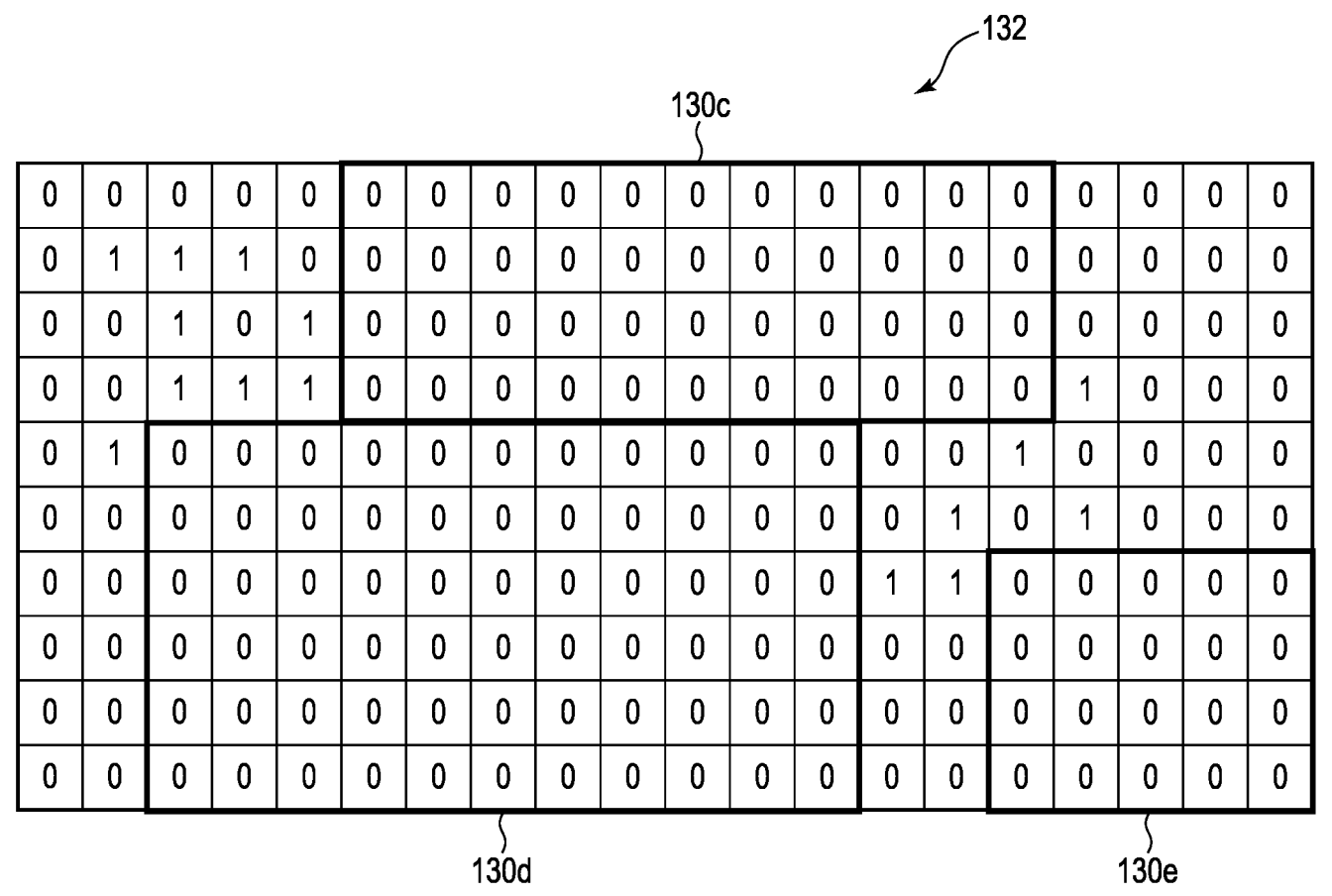

FIG. 9 shows another example of the rectangle list 132 where the certain size is defined as four pixels by four pixels. The rectangle list 132 shows the positions of the four corners of each of rectangles 130c, 130d, and 130e which has a size larger than or equal to four pixels by four pixels. The rectangle list 132 of FIG. 9 is generated in a similar manner to that illustrated in the flowchart of FIG. 8, except for applying a 1×4 pixel column instead of the 1×5 pixel column.

FIG. 10 is a flowchart showing an example of the process of the point group filter 122 shown in FIG. 6.

In step 142, the point group filter 122 receives the point group 56 with a degree of reliability. In step 144, the point group filter 122 selects one point in the point group 56. In step 146, the point group filter 122 determines whether or not the degree of reliability of the selected point is higher than or equal to a threshold.

If the degree of reliability of the selected point is higher than the threshold (YES in step 146), in step 148, the point group filter 122 accumulates the selected point, that is, the three-dimensional coordinates, in the memory 16. After completion of the process of step 148, the point group filter 122 executes the process of step 150. If the degree of reliability of the selected point is lower than or equal to the threshold (NO in step 146), the point group filter 122 performs the process of step 150.

In step 150, the point group filter 122 determines whether all the points of the point group have been processed, that is, whether or not there is at least one unselected point.

If there is at least one unselected point (YES in step 150), the point group filter 122 selects another point in the point group 56 in step 144. If there is no unselected point (NO in step 150), in step 152, the point group filter 122 outputs the accumulated points as the point group 124, and terminates the process.

Thus, the point group filter 122 is able to output the point group 124 with a high degree of reliability consisting of points in the input point group 56 with a degree of reliability higher than the threshold. The point group filter 122 is able to remove a point or points with low degrees of reliability. Therefore, the estimated point group is a point group with a high degree of reliability.

The process of the point group filters 42 and 58 shown in FIG. 2 is also similar to that of FIG. 10. Note that the point group filters 58 and 122 both remove a point or points from the aberration-mapped point group, and different thresholds can be set for the degree of reliability for removal of a point. For example, assuming a range of a degree of reliability is 1 to 10, the threshold of the point group filter 58 is set to 5, and the threshold of the point group filter 122 is set to 8, even if a point group cannot be generated by the SLAM processor 24, the point group with a degree of reliability of 5 or higher can be retained. However, if the thresholds of the point group filters 58 and 122 are set to a high degree of reliability, there may be such cases where a point or points are excessively removed when a point group cannot be generated by the SLAM processor 24.

Figure 11:
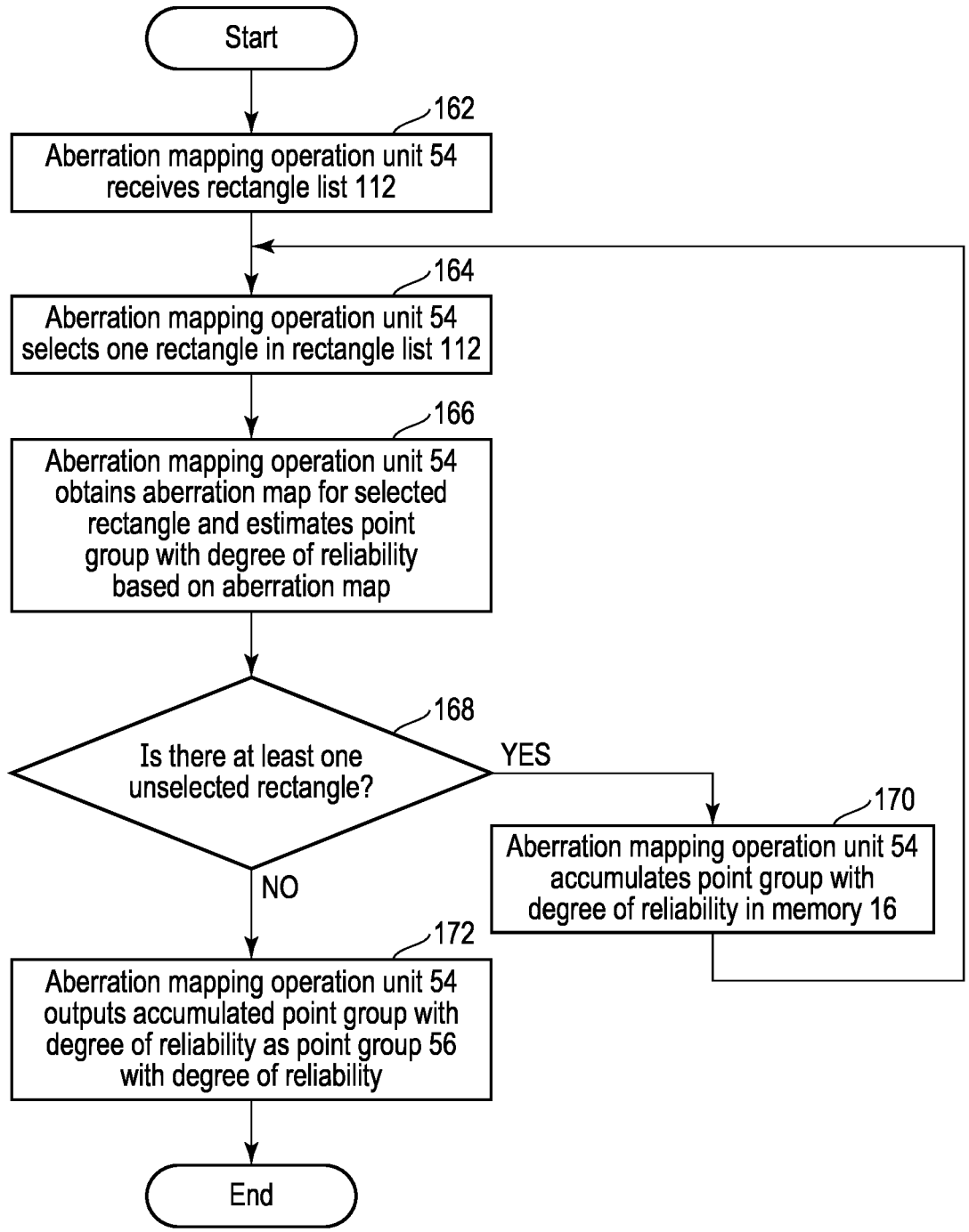
FIG. 11 is a flowchart illustrating an example of the process of an aberration mapping operation unit of the first embodiment.

FIG. 11 is a flowchart illustrating an example of the process of the aberration mapping operation unit 54 shown in FIG. 2.

In step 162, the aberration mapping operation unit 54 receives the rectangle list 112. In step 164, the aberration mapping operation unit 54 selects one rectangle (for example, the rectangle 110a in FIG. 5) in the rectangle list 112. In step 166, the aberration mapping operation unit 54 obtains an aberration map of the image for the selected rectangle and estimates a point group with a degree of reliability based on the aberration map. In step 168, the aberration mapping operation unit 54 determines whether all the rectangles have been processed, that is, whether or not there is at least one unselected rectangle.

If there is at least one unselected rectangle (YES in step 168), in step 170, the aberration mapping operation unit 54 accumulates a point group with a degree of reliability in the memory 16, and in step 164, the aberration mapping operation unit 54 selects another rectangle in the rectangle list 112. If there is no unselected rectangle (NO in step 168), in step 172, the aberration mapping operation unit 54 outputs the accumulated point group with a degree of reliability as the point group 56 with a degree of reliability, and terminates the process.

Thus, the aberration mapping operation unit 54 estimates the point group in the current frame indicated by the rectangle list 112, for an area where the target object is highly likely present, that is, an area where the points are highly likely estimated by the aberration mapping operation. In this manner, the time required for the aberration mapping operation is shortened.

Figure 12:
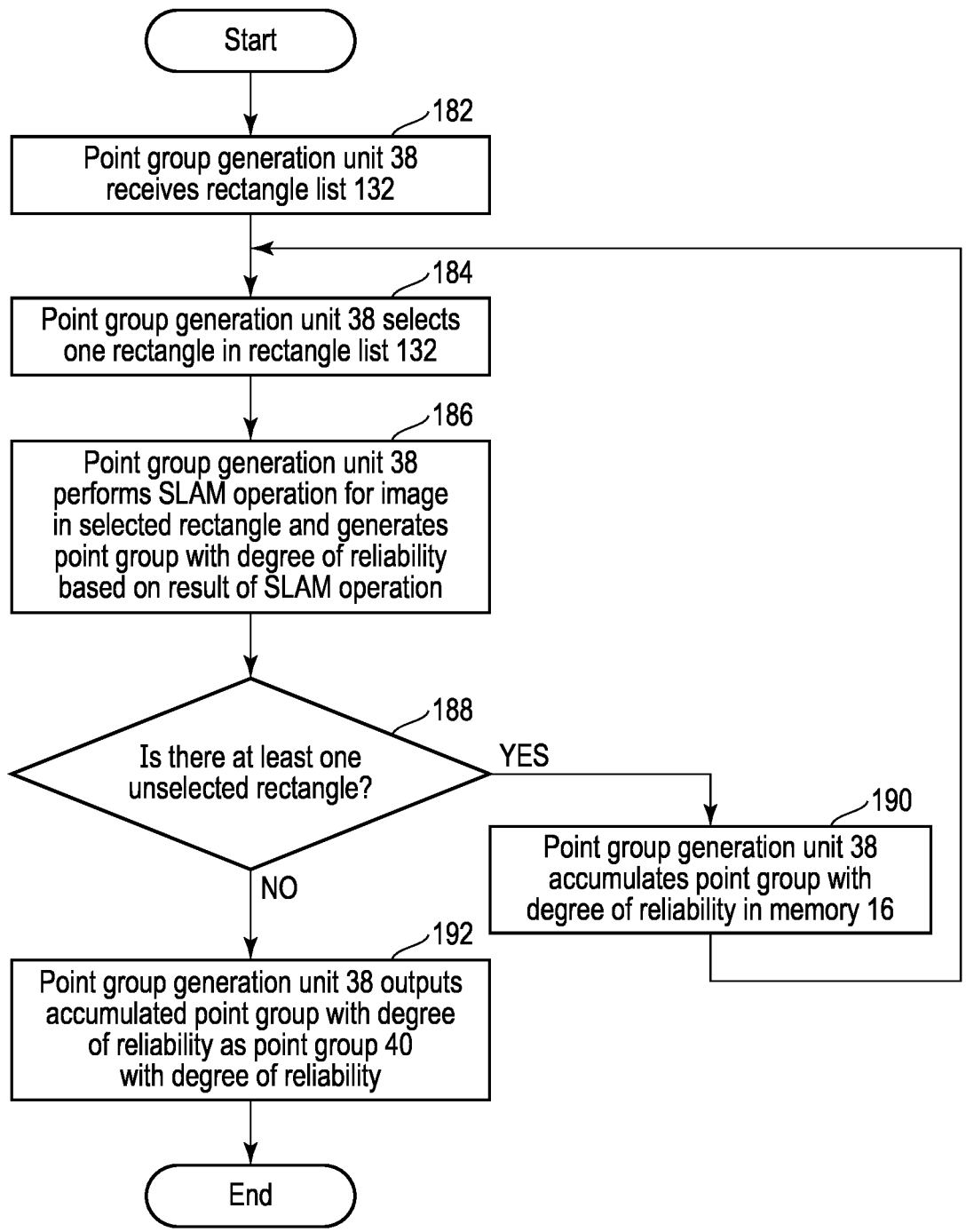
FIG. 12 is a flowchart illustrating an example of the process of a point group generation unit of the first embodiment.

FIG. 12 is a flowchart illustrating an example of the process of the point group generation unit 38 shown in FIG. 2.

In step 182, the point group generation unit 38 receives the rectangle list 132. In step 184, the point group generation unit 38 selects one rectangle (for example, the rectangle 130a in FIG. 7) in the rectangle list 132. In step 186, the point group generation unit 38 performs an SLAM operation for an image in the selected rectangle and generates a point group with a degree of reliability based on a result of the SLAM operation. In step 188, the point group generation unit 38 determines whether all rectangles have been processed, that is, whether or not there is at least one unselected rectangle.

If there is at least one unselected rectangle (YES in step 188), in step 190, the point group generation unit 38 accumulates a point group with a degree of reliability in the memory 16, and in step 184, the point group generation unit 38 selects another rectangle in the rectangle list 132. If there is no unselected rectangle (NO in step 188), in step 192, the point group generation unit 38 outputs the accumulated point group with a degree of reliability as the point group 40 with a degree of reliability, and terminates the process.

The rectangle list 132 includes areas that are not included in the rectangle list 112 that specifies the aberration mapping area, the point group generation unit 38 can complementarily estimate a point group for an area where no point group is estimated by the aberration mapping operation or an area where a point group is estimated by the aberration mapping operation but a degree of reliability thereof is low.

In this embodiment, an area where the point group is likely to be estimated in the current frame is selected as the aberration mapping area, and the aberration mapping operation is performed only for the selected area. Therefore, in this embodiment, as shown in FIG. 13A, the time for selecting the aberration mapping area is added to the time for performing the aberration mapping operation in a comparative example where the aberration mapping operation is performed for the entire image. However, the total processing time is shorter than that of the comparative example because the time for the aberration mapping operation is shortened as compared to the comparative example.

In this embodiment, the area where no point group is estimated by the aberration mapping operation is selected as the point group generation area, and the point group is generated only for the selected area. Therefore, the point group is estimated in an area where no point group is estimated by the aberration mapping operation. In this embodiment, as shown in FIG. 13B, the time for the ego-motion estimation is the same as that of the comparative example. In this embodiment, the time for selecting the point group generation area is added to the time for generating the point group in a comparative example where the point group is generated for the entire image. However, the total processing time is shorter than that of the comparative example because the time for the point group generation is shortened as compared to the comparative example.

FIG. 14 is a diagram illustrating an example of an improvement in distance estimation accuracy by the point group filters 42 and 58. The point group 40 estimated by the SLAM processor 24 is supplied to the merge unit 28 through the point group filter 42. The point group 56 estimated by the aberration mapping processor 26 is supplied to the merge unit 28 through the point group filter 58. As shown in FIG. 14, the point group filters 42 and 58 output only a point or points whose degrees of reliability are higher than a threshold, and remove a point or points whose degrees of reliability are lower than or equal to the threshold. Therefore, the point group 62 output from the merge unit 28 is a point group with a high degree of reliability.

Other embodiments will be described below.

Second Embodiment

Figure 15:
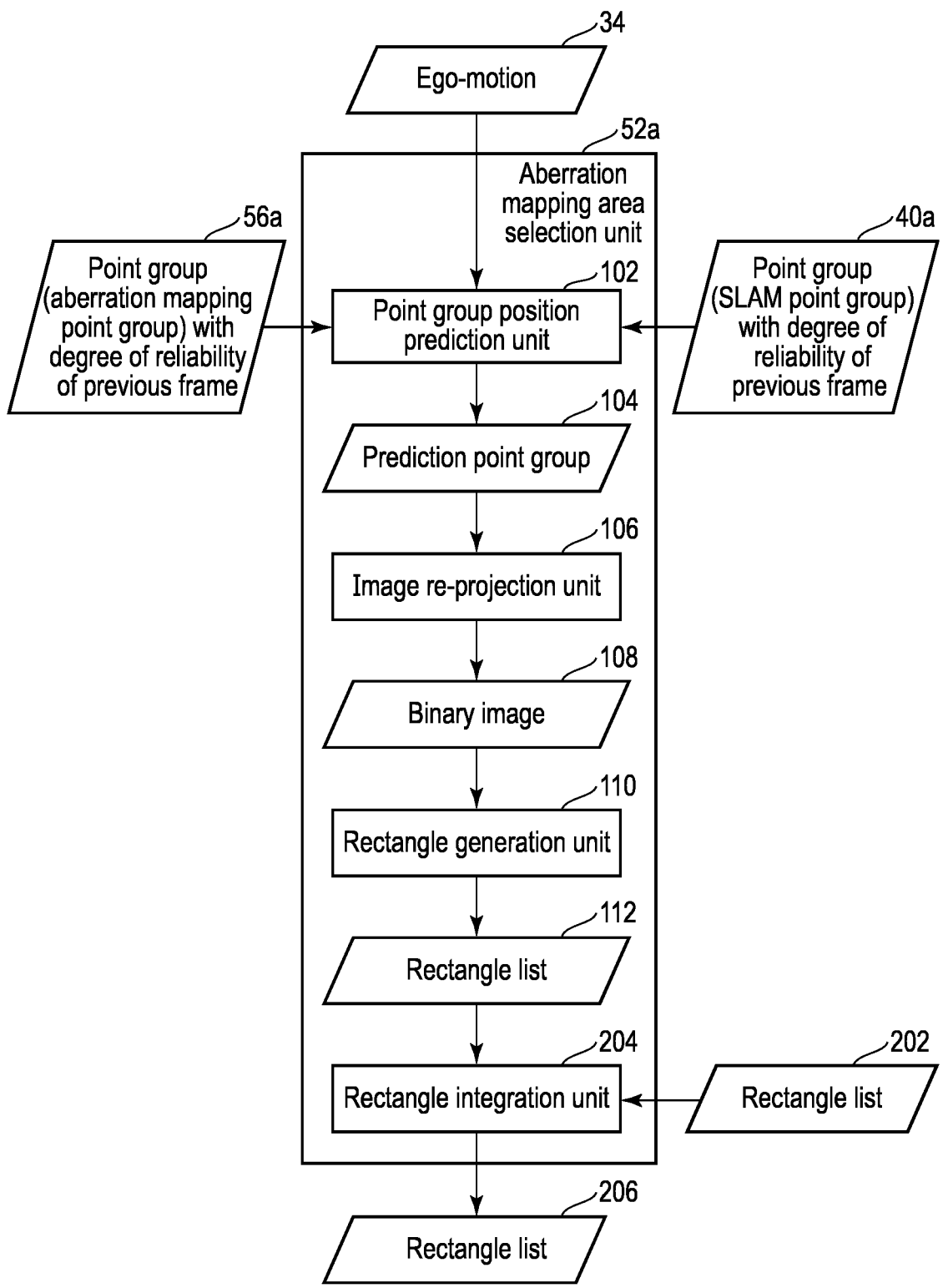
FIG. 15 is a functional block diagram showing an example of an aberration mapping area selection unit of a second embodiment.

The distance estimation device of the second embodiment is mostly the same in configuration as that shown in FIG. 2. In the second embodiment, the aberration mapping area selection unit 52 in FIG. 2 is replaced by an aberration mapping area selection unit 52a. FIG. 15 is a functional block diagram showing an example of the aberration mapping area selection unit 52a of the second embodiment.

The aberration mapping area selection unit 52a includes a rectangle integration unit 204 added thereto as compared to the aberration mapping area selection unit 52 shown in FIG. 2. The rectangle generation unit 110 supplies the generated rectangle list 112 to the rectangle integration unit 204. A second rectangle list 202 is also supplied to the rectangle integration unit 204. The second rectangle list 202 is a list created by a generating unit other than the rectangle generating unit 110, and indicates at least one rectangle whose point group is to be estimated by the aberration mapping operation. The second rectangle list 202 may be created, for example, by some other device to which images from the camera 12 are input or may be input by the user by means of a keyboard or the like in this distance estimation device.

It is known that in point group generation, a point group is not easily generated near epipoles of the image. Therefore, the second rectangle list 202 may indicate at least one rectangle including an epipole so as to select an area near the epipole of the image as the aberration mapping area. The second rectangle list 202 may also indicate at least one rectangle including a moving object whose position cannot be predicted by an ego-motion only.

The rectangle integration unit 204 integrates the rectangle list 112 of the first embodiment and the second rectangle list 202, and generates an integrated rectangle list 206.

FIG. 16 illustrates an example of the process of the rectangle integration unit 204 shown in FIG. 15. The rectangle integration unit 204 outputs the smallest rectangle including the rectangle list 112 and the second rectangle list 202 as the integrated rectangle list 206.

According to the second embodiment, the aberration map can be calculated even for the area not included in the rectangle list 112 generated from the current frame prediction point group 104 predicted from the ego-motion of the current frame, the aberration mapping point group of the previous frame, and the SLAM point group of the previous frame. Therefore, the area where the point group is estimated by the aberration mapping operation can be expanded to the minimum necessary level, thereby improving the possibility that the point group is estimated.

Third Embodiment

Figure 17:
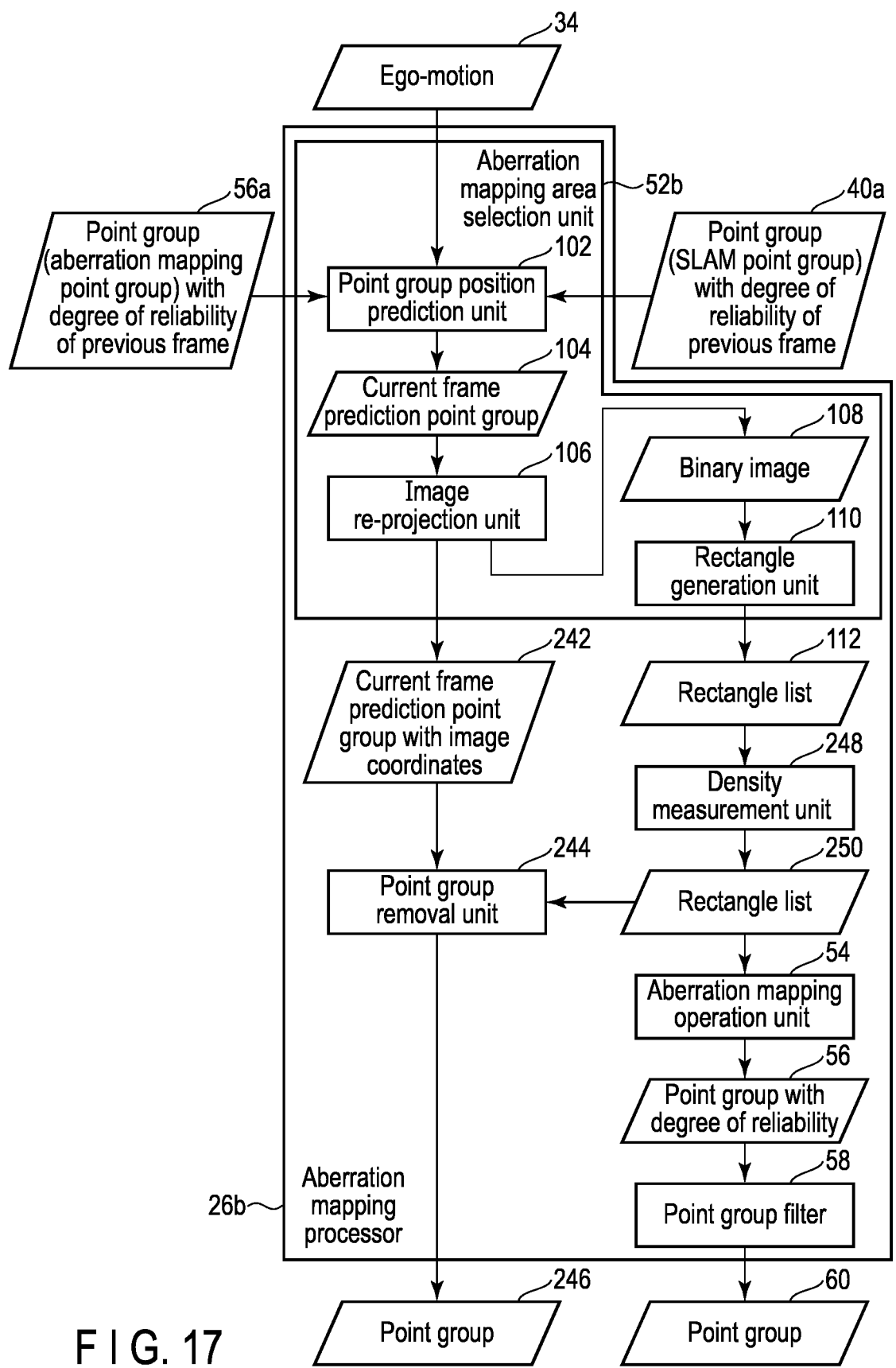
FIG. 17 is a functional block diagram showing an example of an aberration mapping processor of a third embodiment.

The distance estimation device of the third embodiment is mostly the same in configuration as that shown in FIG. 2. In the third embodiment, the aberration mapping processor 26 in FIG. 2 is replaced by an aberration mapping processor 26b. FIG. 17 is a functional block diagram showing an example of the aberration mapping processor 26b of the third embodiment.

The aberration mapping processor 26b includes an aberration mapping area selection unit 52b, a density measurement unit 248, an aberration mapping operation unit 54, a point group filter 58, and a point group removal unit 244.

The aberration mapping area selection unit 52b is similar in configuration to the aberration mapping area selection unit 52 shown in FIG. 4. But, in the third embodiment, the image re-projection unit 106 generates a current frame prediction point group 242 with image coordinates in addition to the binary image 108. The current frame predictive point group 242 with image coordinates is used to determine as to which pixel the 3-dimensional coordinates of each point correspond to when re-projected. The image re-projection unit 106 supplies the current frame prediction point group 242 with image coordinates to the point group removal unit 244. The current frame prediction point group 104 does not contain image coordinates. For example, it is assumed that the 3-dimensional coordinates of one point included in the current frame prediction point group 104 is (10, 20, 30). When this point is projected to the image coordinates of (30, 50) by the image re-projection unit 106, the current frame prediction point group 242 with image coordinates possesses the information of (10, 20, 30) and (30, 50).

The aberration mapping area selection unit 52b supplies the rectangle list 112 to the density measurement unit 248. For each rectangle indicated by the rectangle list 112, the density measurement unit 248 measures the density of pixels in a rectangle where the target object is present, excludes a rectangle or rectangles having densities of pixels higher than a threshold, and generates a rectangle list 250 indicating a rectangle or rectangles having densities of pixels lower than or equal to the threshold.

Generally, if the density of the pixels in the point group 62 estimated for the same target object is higher, the distance estimation accuracy can be improved by applying a statistical process, for example, averaging, to a point group that contain errors and have dispersion. For example, when the dispersion is in accordance with a normal distribution, the improvement of the accuracy can be expected by averaging the estimation results over a larger number of points in a dense point group. But there is an upper limit to the density up to which accuracy can be improved, and when the density exceeds the upper limit, a degree of reliability saturates. Therefore, the density measurement unit 248 generates a rectangle list 250 which indicates that the aberration mapping operation is not performed for an area in the binary image 108 where the density of the pixels is higher than a threshold. In other words, the rectangle list 250 includes only a rectangle or rectangles where the density of the pixels is less than or equal to the threshold by removing, from the rectangle list 112, the rectangle or rectangles where the density of the pixels is higher than the threshold.

The density measurement unit 248 supplies the rectangle list 250 to the aberration mapping operation unit 54 and the point group removal unit 244.

The aberration mapping operation unit 54 estimates the point group by aberration mapping operation for the rectangle indicated in the rectangle list 250. In other words, the aberration mapping operation unit 54 estimates the point group 56 with a degree of reliability for an area where the density of the pixels is lower than or equal to the threshold. The point group 56 with a degree of reliability is supplied to the merge unit 28 as the point group 60 (aberration mapping point group) through the point group filter 58.

The point group removal unit 244 removes the point group of a rectangle or a rectangles in the current frame prediction point group 242, which are indicated by the rectangle list 250. In other words, the point group removal unit 244 outputs a current frame prediction point group 246 with image coordinates of an area or areas where the densities of the pixels are higher than the threshold. In the above example, the point group removal unit 244 removes a point having 3-dimensional coordinates of (10, 20, 30) if a point having coordinates of (30, 50) is included in the rectangle list 250. The point group 246 is also supplied to the merge unit 28. For a rectangle including a point group removed by the point group removal unit 244, a point group is generated by the aberration mapping operation unit 54 as a process for the current frame. For a rectangle where a dense point group is generated in the previous frame, no point group is generated in the current frame. In place, the current frame prediction point group, which is predicted from the point group of the previous frame, is output. On the other hand, for a rectangle where a sparse point group is generated in the previous frame, the prediction point group is removed and a point group is newly generated in the current frame.

That is, for an area where the point group with a density lower than or equal to a threshold is present in the binary image 108, the point group 56 estimated by the aberration mapping operation unit 54 is used. For an area where the point group with a density higher than the threshold is present in the binary image 108, the current frame prediction point group 242 with image coordinates is used.

FIG. 18 is a flowchart illustrating an example of the process of the density measurement unit 248 shown in FIG. 17.

In step 262, the density measurement unit 248 receives the rectangle list 112. In step 264, the density measurement unit 248 selects one rectangle (for example, the rectangle 110*a* in FIG. 5) in the rectangle list 112. In step 266, the density measurement unit 248 counts the number of pixels in the selected rectangle, which have pixel values of 1. In step 268, the density measurement unit 248 determines whether or not the ratio of the number of pixels having the pixel values of 1 to the size of the rectangle is less than or equal to a threshold.

If the ratio of the number of pixels to the rectangle size is not less than the threshold (NO in step 270), in step 270, the density measurement unit 248 accumulates the rectangle list indicating the selected rectangle in the memory 16, and the density measurement unit 248 executes the process of step 272. If the ratio of the number of pixels to the rectangle size is lower than or equal to the threshold (YES in step 270), the density measurement unit 248 executes the process of step 272.

In step 272, the density measurement unit 248 determines whether all the rectangles have been processed, that is, whether or not there is at least one unselected rectangle.

If there is at least one unselected rectangle (YES in step 272), in step 264, the density measurement unit 248 selects another rectangle in the rectangle list 112. If there is no unselected rectangle (NO in step 272), in step 274, the density measurement unit 248 outputs the accumulated rectangle list as the rectangle list 250, and terminates the process.

Thus, the density measurement unit 248 removes, from the rectangle list 112, a rectangle or rectangles whose densities of the pixels are higher than the threshold, and outputs the rectangle list 250 containing only a rectangle or rectangles in the rectangle list 112, whose densities of the pixels are lower than or equal to the threshold.

Fourth Embodiment

In the above embodiments, the aberration mapping processor 26 mainly estimates the point group, and the SLAM processor 24 complementarily estimates the point group for an area where the point group cannot be easily estimated by the aberration mapping processor 26. The fourth embodiment will be described, where the SLAM processor 24 mainly estimates the point group, and the aberration mapping processor 26 complementarily estimates the point group for an area where the point group cannot be easily estimated by the SLAM processor 24.

Figure 19:
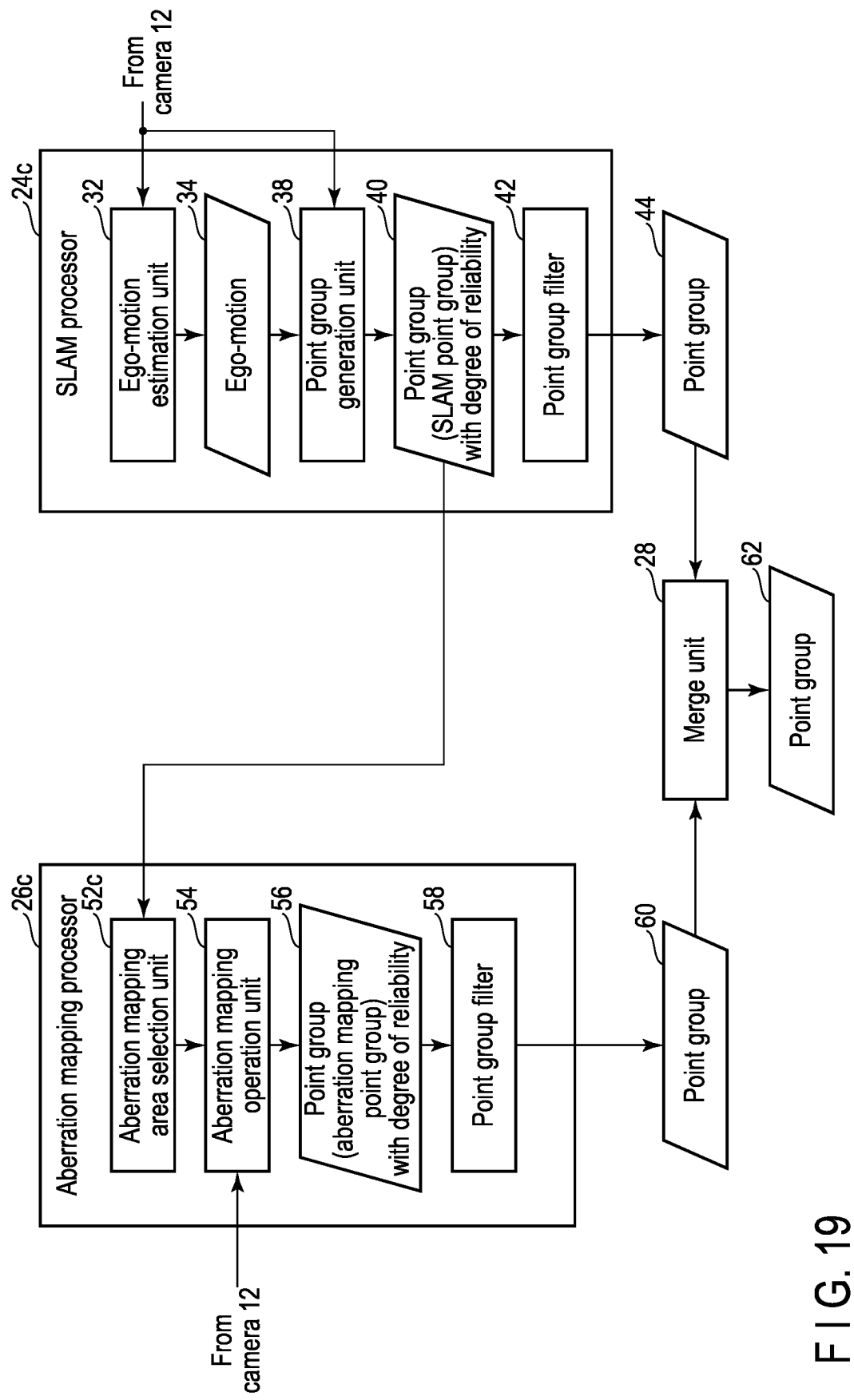
FIG. 19 is a functional block diagram showing an example of the distance estimation unit of a fourth embodiment.

FIG. 19 is a functional block diagram showing an example of the distance estimation unit of a distance estimation device of the fourth embodiment. The distance estimation device of the fourth embodiment includes an SLAM processor 24*c*, an aberration mapping processor 26*c*, and the merge unit 28.

The SLAM processor 24*c* is similar to the SLAM processor 24 shown in FIG. 2, except that the point group generation area selection unit 36 is omitted.

The point group generation unit 38 generates the point group 40 with a degree of reliability and supplies the point group 40 to the point group filter 42 and an aberration mapping area selection unit 52*c*. The point group filter 42 supplies the point group 44 to the merge unit 28.

The aberration mapping processor 26*c* is similar to the aberration mapping processor 26 of FIG. 2, except that the aberration mapping area selection unit 52 is replaced by the aberration mapping area selection unit 52c. The aberration mapping area selection unit 52c is different from the aberration mapping area selection unit 52 in FIG. 2 in that the ego-motion estimated by the SLAM processor 24c is not input to the aberration mapping area selection unit 52c.

The aberration mapping operation unit 54 generates the point group 56 with a degree of reliability and supplies the point group 56 to the point group filter 58. The point group filter 58 supplies the point group 60 to the merge unit 28.

Figure 20:
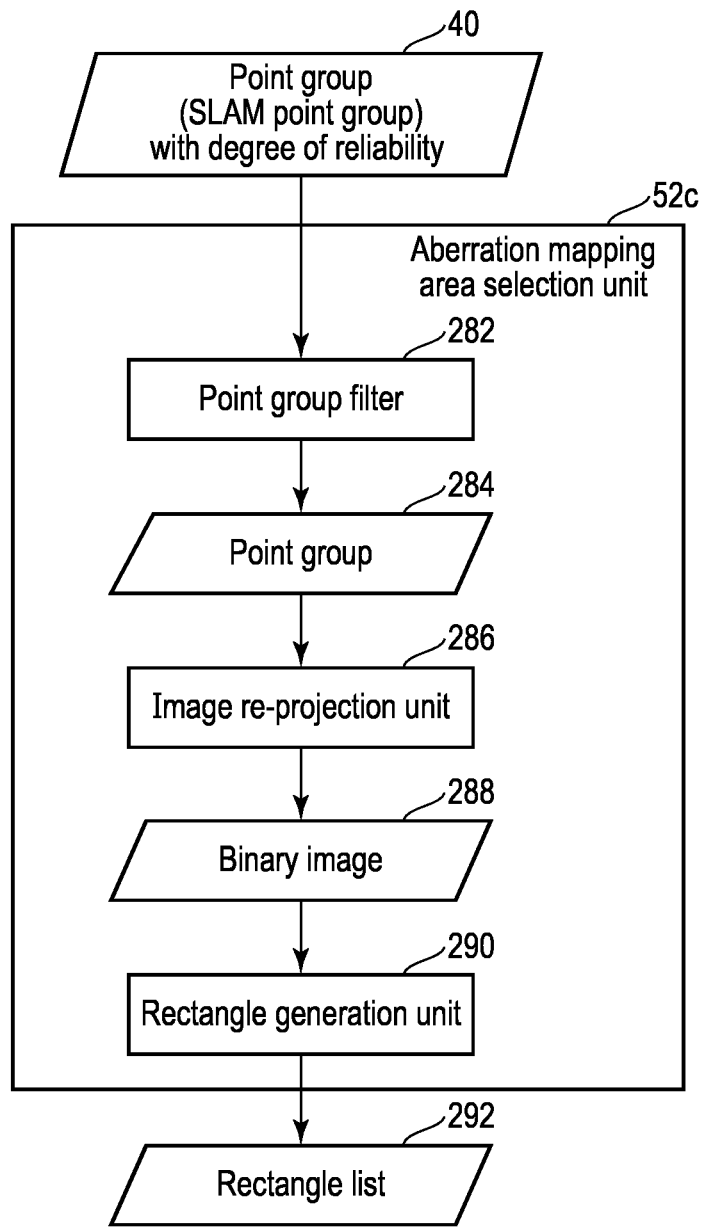
FIG. 20 is a functional block diagram showing an example of an aberration mapping area selection unit of the fourth embodiment.

FIG. 20 is a functional block diagram showing an example of the aberration mapping area selection unit 52c. The aberration mapping area selection unit 52c includes a point group filter 282, an image re-projection unit 286, and a rectangle generation unit 290. The point group 40 (SLAM point group) with a degree of reliability is supplied to the point group filter 282. The point group filter 282 filters a point or points in the point group 40 based on a degree of reliability, and does not output a point or points with low degrees of reliability, but outputs a point or points with high degrees of reliability as a point group 284. The reason why the point group filter 282 is provided is that the point group 40 with a low degree of reliability generated by the SLAM processor 24 is removed and the point group 56 is generated by the aberration mapping processor 26c.

The point group filter 282 supplies the point group 284 to the image re-projection unit 286.

Similar to the image re-projection unit 106 of the first embodiment, the image re-projection unit 286 generates a binary image 288 for all pixels in the image of the current frame, where the pixel value of the pixel where the target object is present is 1, and the pixel value of the pixel where the target object is not present is 0. The binary image 288 is supplied to the rectangle generation unit 290.

The rectangle generation unit 290 outputs a rectangle list 292 representing a rectangle or rectangles of a certain size or larger consisting only of pixels whose pixel values are 0, as in the case of the rectangle generation unit 130 in the point group generation area selection unit 36 of the first embodiment.

The rectangle list 292 is supplied to the aberration mapping operation unit 54. The aberration mapping operation unit 54 performs aberration mapping operation on the rectangle or rectangles indicated by the rectangle list 292 and generates the point group 56 with a degree of reliability.

According to the fourth embodiment, the point group generation unit 38 generates the point group for the entire image and estimates the point group 40 with a degree of reliability. The aberration mapping operation unit 54 complementarily estimates the point group for an area where the point group 40 (SLAM point group) is not estimated by the point group generation, or an area where the point group 40 (SLAM point group) is estimated by the point group generation but a degree of reliability is low.

Fifth Embodiment

In the above embodiments, the SLAM processor 24 estimates the ego-motion from the image from the camera 12. The fifth embodiment will be explained, where the aberration mapping processor 26 estimates the ego-motion.

Figure 21:
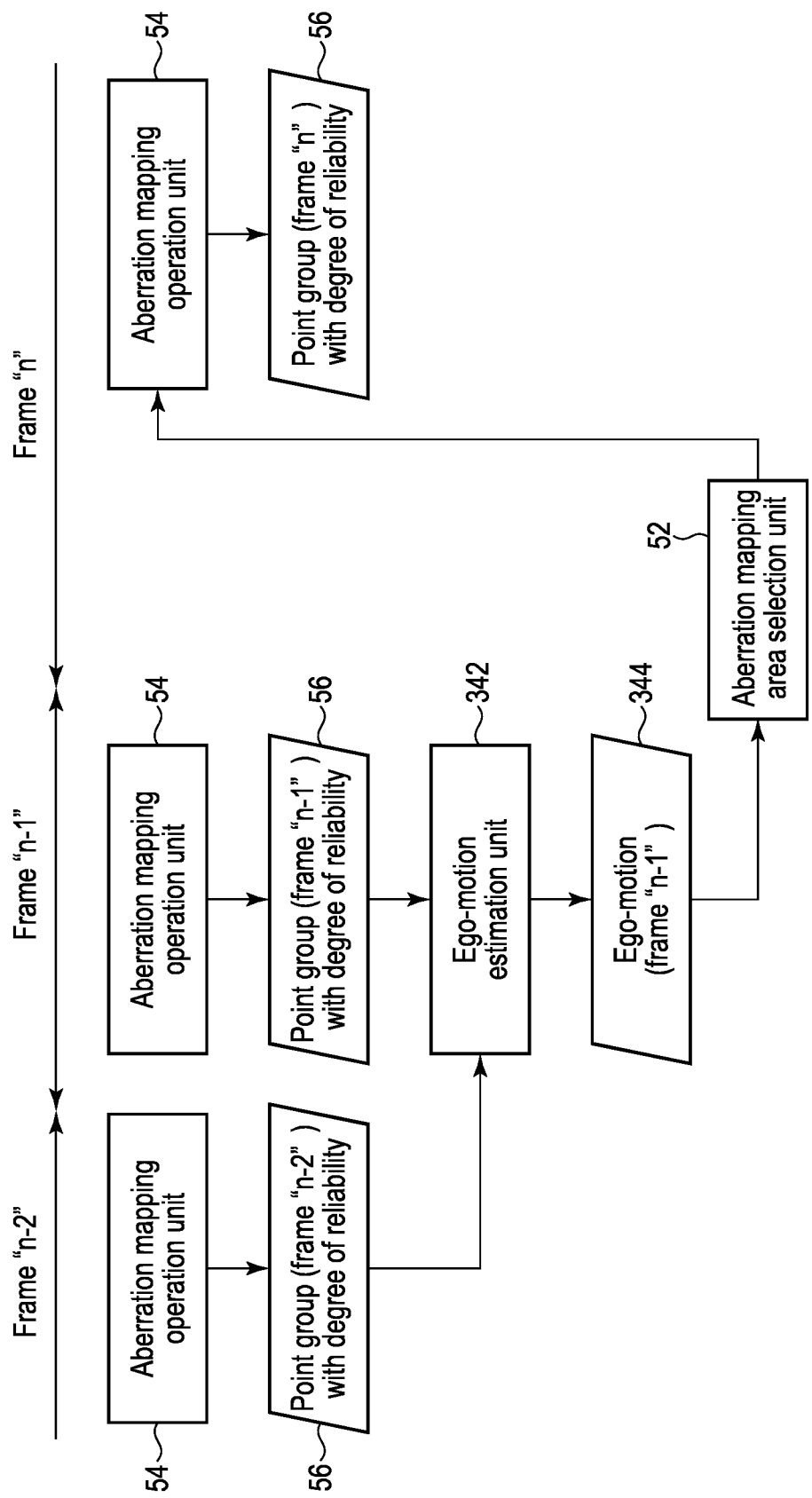
FIG. 21 is a timing chart illustrating an example of the operation of an aberration mapping processor of a fifth embodiment.

FIG. 21 is a timing chart illustrating an example of the operation of the aberration mapping processor of the fifth embodiment. The aberration mapping processor of the fifth embodiment is formed by adding an ego-motion estimation unit 342 to the aberration mapping processor 26 of the above embodiments. The point group 56 with a degree of reliability, which is output from the aberration mapping operation unit 54, is supplied to the ego-motion estimation unit 342. An ego-motion 344, which is output from the ego-motion estimation unit 342, is supplied to the aberration mapping area selection unit 52.

When an image of a frame "n−2" is supplied to the aberration mapping operation unit 54, the aberration mapping operation unit 54 generates the point group 56 with a degree of reliability of the frame "n−2" and supplies the point group 56 to the ego-motion estimation unit 342.

When an image of a frame "n−1" is supplied to the aberration mapping operation unit 54, the aberration mapping operation unit 54 generates the point group 56 with a degree of reliability of the frame "n−1" and supplies the point group 56 to the ego-motion estimation unit 342.

The ego-motion estimator 32 generates the ego-motion 344 of the frame "n−1" from the point group 56 of the two images of the frame "n−2" and the frame "n−1", and supplies the ego-motion 344 to the aberration mapping area selection unit 52. The ego-motion estimating unit 32 can estimate the ego-motion by utilizing a technique of aligning point group such as the iterative closest point (ICP) method.

The aberration mapping area selection unit 52 selects an aberration mapping area of a frame "n" based on the ego-motion 344 of the frame "n−1". Note that the frame for which the area is selected (the frame "n") and the frame of the ego-motion (the frame "n−1") are different from each other, and the ego-motion 344 is also estimated from the images of the two frames. But the ego-motions between successive frames are similar, and therefore the aberration mapping area of the frame "n" can be selected based on the ego-motion 344 of the frame "n−1".

The aberration mapping operation unit 54 generates the point group 56 with a degree of reliability, of the frame "n" for the aberration mapping area.

Although omitted from FIG. 21, in each frame, the aberration mapping operation unit 54 generates the point group 56 with a degree of reliability, and in each frame, the ego-motion estimation unit 342 estimates the ego-motion 344 of the frame from the two point groups of the frame "n" and the one previous frame "n−1". In each frame, the aberration mapping area selection unit 52 as well selects an aberration mapping area based on the ego-motion of the one previous frame.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A distance estimation device comprising:
a first distance estimation unit configured to estimate first distances of pixels in a first area in an image of an object based on a first estimation method; and
a second distance estimation unit configured to estimate second distances of pixels in a second area in the image of the object, the second area being different from the first area, based on a second estimation method different from the first estimation method, wherein
the first distance estimation unit is configured to determine the first area based on the second distances; and the second distance estimation unit is configured to determine the second area based on the first distances and the second distances.

2. The distance estimation device of claim 1, wherein
the first distance estimation unit is configured to
estimate degrees of reliability of the first distances, and
output a part of the first distances with the degrees of reliability higher than a first degree; and
the second distance estimation unit is configured to
estimate degrees of reliability of the second distances, and
output a part of the second distances with the degrees of reliability higher than a second degree.

3. The distance estimation device of claim 1, wherein
the first distance estimation unit is configured to estimate an ego-motion of the distance estimation device based on two images of the object captured at different angles; and
the second distance estimation unit is configured to determine the second area based on the ego-motion, the first distances, and the second distances.

4. The distance estimation device of claim 3, wherein
the first distance estimation unit is configured to estimate the ego-motion based on a first image of the object captured at a first time and a second image of the object captured at a second time prior to the first time; and
the second distance estimation unit is configured to determine the second area based on the ego-motion, the first distances of the second image estimated by the first distance estimation unit, and the second distances of the second image estimated by the second distance estimation unit.

5. The distance estimation device of claim 3, wherein a shape of the first area is a rectangle and a shape of the second area is a rectangle.

6. The distance estimation device of claim 3, wherein
the second distance estimation unit is configured to receive an area specifying signal and determine the second area based on the ego-motion, the first distances, the second distances, and the area specifying signal.

7. The distance estimation device of claim 3, wherein
the second area includes partial areas;
the second distance estimation unit is configured to calculate a ratio of a number of pixels for which the distance is estimated to a total number of pixels for each of the partial areas based on the ego-motion, the first distances, and the second distances;
the second distance estimation unit is configured to estimate distances of pixels in one of the partial areas if the ratio is smaller than or equal to a first ratio; and
the second distance estimation unit is configured not to estimate distances of pixels in one of the partial areas if the ratio is larger than the first ratio.

8. The distance estimation device of claim 3, wherein the first distance estimation unit is configured to determine the first area including pixels for which the distances are not estimated by the second distance estimation unit.

9. A distance estimation method comprising:
estimating first distances of pixels in a first area in an image of an object by a first distance estimation unit based on a first estimation method;
estimating second distances of pixels in a second area in the image of the object by a second distance estimation unit based on a second estimation method;
changing at least one of the second distances based on the first distances;
determining the first area by the first distance estimation unit based on the second distances; and
determining the second area by the second distance estimation unit based on the first distances and the second distances.

10. The distance estimation method of claim 9, comprising:
estimating, by the first distance estimation unit, an ego-motion of an distance estimation device comprising the first distance estimation unit and the second distance estimation unit based on two images of the object captured at different angles; and
determining the second area by the second distance estimation unit based on the ego-motion, the first distances, and the second distances.

* * * * *